US008073280B2

(12) United States Patent
Yamamoto

(10) Patent No.: US 8,073,280 B2
(45) Date of Patent: Dec. 6, 2011

(54) IMAGE PROCESSING APPARATUS AND IMAGE PROCESSING PROGRAM FOR CORRECTING IMAGE DEGRADATION

(75) Inventor: Yasutoshi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1212 days.

(21) Appl. No.: 11/749,315

(22) Filed: May 16, 2007

(65) Prior Publication Data

US 2007/0269112 A1 Nov. 22, 2007

(30) Foreign Application Priority Data

May 16, 2006 (JP) ................................. 2006-136053

(51) Int. Cl.
*G06K 9/40* (2006.01)
(52) U.S. Cl. ....................................... 382/255
(58) Field of Classification Search .................... 382/255
See application file for complete search history.

(56) References Cited

U.S. PATENT DOCUMENTS

| | | | | |
|---|---|---|---|---|
| 5,365,303 | A * | 11/1994 | Yamasaki et al. | 396/53 |
| 5,537,226 | A * | 7/1996 | Wolberg et al. | 358/486 |
| 6,882,449 | B2 * | 4/2005 | Kimmel et al. | 358/1.9 |
| 6,987,530 | B2 * | 1/2006 | McConica | 348/208.6 |
| 2005/0237534 | A1 * | 10/2005 | Deck | 356/497 |
| 2005/0244077 | A1 * | 11/2005 | Kitamura et al. | 382/261 |
| 2005/0249429 | A1 * | 11/2005 | Kitamura | 382/255 |
| 2005/0259888 | A1 * | 11/2005 | Ozluturk | 382/260 |
| 2006/0078218 | A1 * | 4/2006 | Igarashi | 382/255 |

FOREIGN PATENT DOCUMENTS

| | | |
|---|---|---|
| JP | 11-284944 | 10/1999 |
| JP | 2003-46782 | 2/2003 |

OTHER PUBLICATIONS

Fergus et al., Removing Camera Shake from a Single Photograph, ACM Transactions on Graphics, vol. 25, Issue 3, Jul. 2006, pp. 787-794.*

Lewis, Fast Normalized Cross-Correlation, Vision Interface, 1995, pp. 120-123.*

* cited by examiner

*Primary Examiner* — David Zarka
(74) *Attorney, Agent, or Firm* — Hamre, Schumann, Mueller & Larson, P.C.

(57) ABSTRACT

An image processing apparatus according to the present invention includes a feature extracting portion that extracts a feature of a frequency characteristic of an input image, a correction amount calculating portion that calculates a correction amount of the frequency characteristic from the feature extracted by the feature extracting portion, and an image correcting portion that corrects the input image according to the correction amount calculated by the correction amount calculating portion. This configuration achieves imperviousness to frequency characteristics of a subject and makes it possible to correct image degradation properly so as to restore an image.

47 Claims, 18 Drawing Sheets

--Prior Art--

# IMAGE PROCESSING APPARATUS AND IMAGE PROCESSING PROGRAM FOR CORRECTING IMAGE DEGRADATION

BACKGROUND OF THE INVENTION

1. Field of the Invention

The present invention relates to an image processing apparatus and an image processing program that are mounted in a digital camera or the like. In particular, the present invention relates to a technology for restoring an image that is blurred due to camera shake or the like.

2. Description of Related Art

In recent years, as digital cameras achieve a smaller size and a higher zooming factor, a camera shake correction has become necessary in many cases.

The system of camera shake correction includes an optical camera shake correction system and an electronic camera shake correction system. In the optical camera shake correction system, an optical system is controlled according to the amount of camera shake, thereby keeping an image forming position constant on an imaging device. On the other hand, in the electronic camera shake correction system, at the time of signal processing of an image formed on an imaging device in the state where the camera is shaken due to hand movement, a part of the image is cut out according to the amount of camera shake so that a subject always is displayed at the same position.

The electronic camera shake correction system is effective in the case of moving image capturing where images are captured successively, whereas the optical camera shake correction system has to be employed in the case of still image capturing.

However, since the optical system is controlled in the optical camera shake correction system, such a digital camera has a larger body than that not having means for the optical camera shake correction. Also, even when the optical camera shake correction is employed, it sometimes is impossible to follow all of the actual camera shake due to mechanical constraints. Accordingly, the camera shake is not always corrected completely, so that a camera shake component remains in some cases.

In response to this, an image processing apparatus is suggested for detecting a camera shake component remaining in an input image and performing signal processing to correct camera shake. For example, JP 11(1999)-284944A discloses the configuration in which an image is corrected by signal processing.

In the following, a conventional image processing apparatus (for example, that disclosed in JP 11(1999)-284944A) will be described with reference to FIGS. 19 and 20.

FIG. 19 is a block diagram showing a configuration of the conventional image processing apparatus. In FIG. 19, an image signal that is recorded by a camera or the like and converted to digital form is input to an input portion 101. The image signal to be input to the input portion 101 may be an image signal of an image captured by a digital camera or an image signal that is obtained by scanning a photograph taken using a film camera and converting the data to digital form. A CPU 102 controls an operation of the image processing apparatus. An image memory 103 temporarily stores the image signal input to the input portion 101, provides the image signal to the CPU 102 according to the control of the CPU 102, and stores again an image signal processed by the CPU 102.

Constituent components in FIG. 19 are similar to those in a general purpose computer, and the conventional image processing apparatus also can be embodied in the general purpose computer.

FIG. 20 is a flowchart for describing a camera shake correction method in the conventional image processing apparatus.

In the conventional image processing apparatus, first, the CPU 102 reads out an image signal (an image signal of the image that is blurred due to camera shake) stored in the image memory 103 and divides the image based on the read-out image signal into small block regions (S1). For example, the image based on the image signal read out from the image memory 103 is divided into small block regions of 3×3 or 5×5 dots.

Next, the CPU 102 performs edge detection for each of the small block regions of the image and determines the small region having the largest edge amount to be a "feature region" (S2). Herein, the "edge amount" is obtained by integration of an edge signal obtained by the edge detection over the small region. The edge amount increases with more minute edges in the image and decreases with fewer edges therein, which is a flat image.

Thereafter, the CPU 102 performs a two-dimensional filter processing of the image signal of the image in the feature region, thereby detecting a camera shake direction (S3).

Subsequently, the CPU 102 performs an image computation processing of the image signal of the image in the feature region while varying an assumed camera shake amount, thereby detecting a camera shake amount (S4).

Then, the CPU 102 determines a degradation function from the camera shake direction and the camera shake amount that have been detected (S5).

Next, the CPU 102 divides an image based on the image signal input to the input portion 101 into small block regions (S6).

Thereafter, the CPU 102 restores a pixel signal based on the degradation function obtained in S5 (S7).

Subsequently, the CPU 102 combines the image signals of the small regions whose pixel signal has been restored, thus restoring an overall image signal (S8). The image signal restored in the CPU 102 is output from an output portion 104.

However, although the processing of extracting the feature region (S2) disclosed in JP 11(1999)-284944A extracts the small region having a large edge amount as the feature region by performing the edge detection, the frequency characteristics of an image do not necessarily depend on the camera shake direction. For example, the result of detecting camera shake direction in the case where the small region whose vertical line has a large edge amount is extracted as the feature region sometimes is different from that in the case where the small region whose horizontal line has a large edge amount is extracted as the feature region. In the former case, the camera shake amount can be detected for horizontal camera shake but cannot be detected for vertical camera shake due to its high image correlation.

As described above, the image processing apparatus disclosed in JP 11(1999)-284944A sometimes cannot detect the camera shake amount, leading to a problem that it is not possible to restore the image signal input to the input portion 101 properly.

SUMMARY OF THE INVENTION

It is an object of the present invention to solve the conventional problem described above and to provide an image processing apparatus and an image processing program that are impervious to frequency characteristics of a subject and can correct image degradation properly so as to restore an image.

An image processing apparatus according to the present invention includes a feature extracting portion that extracts a feature of a frequency characteristic of an input image, a correction amount calculating portion that calculates a correction amount of the frequency characteristic from the feature extracted by the feature extracting portion, and an image correcting portion that corrects the input image according to the correction amount calculated by the correction amount calculating portion.

Further, an image processing program according to the present invention causes a computer to function as a feature extracting portion that extracts a feature of a frequency characteristic of an input image, a correction amount calculating portion that calculates a correction amount of the frequency characteristic from the feature extracted by the feature extracting portion, and an image correcting portion that corrects the input image according to the correction amount calculated by the correction amount calculating portion.

Moreover, an imaging apparatus according to the present invention includes an imaging system that is capable of generating a low resolution image and a high resolution image selectively, an image storing portion that stores an image signal of an image generated by the imaging system, a feature extracting portion that extracts a feature of a frequency characteristic of the image signal stored in the image storing portion, a correspondence output portion that outputs a reference frequency characteristic corresponding to the feature of the frequency characteristic of the image signal of the low resolution image extracted by the feature extracting portion, a correction amount calculating portion that calculates a correction amount based on the feature of the frequency characteristic output from the feature extracting portion and a feature of the reference frequency characteristic output from the correspondence output portion, and an image correcting portion that corrects the image signal of the high resolution image according to the correction amount calculated by the correction amount calculating portion. The correction amount calculating portion reads out from the correspondence output portion the reference frequency characteristic corresponding to the feature of the frequency characteristic of the image signal of the low resolution image extracted by the feature extracting portion, compares the feature of the frequency characteristic of the image signal of the high resolution image extracted by the feature extracting portion and the feature of the reference frequency characteristic read out from the correspondence output portion and calculates the correction amount that brings the feature of the frequency characteristic of the image signal of the high resolution image extracted by the feature extracting portion closer to the feature of the reference frequency characteristic read out from the correspondence output portion.

In accordance with the present invention, it is possible to achieve an excellent effect of correcting image degradation properly so as to restore an image that is degraded due to camera shake, without being influenced considerably by the frequency characteristics of a subject.

DETAILED DESCRIPTION OF THE INVENTION

Concept of Camera Shake Correction

First, the concept of camera shake correction in the present invention will be described.

Figure 1A:
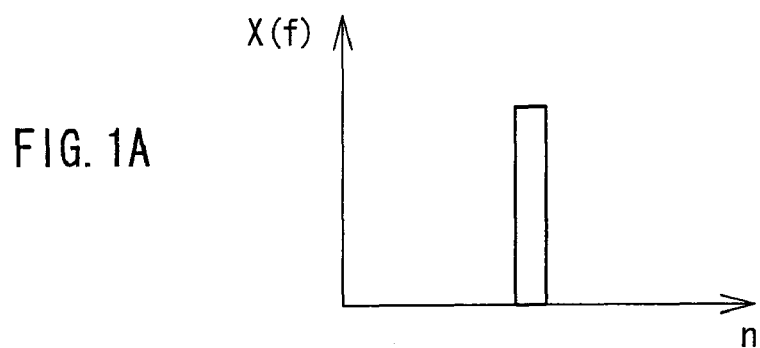
FIGS. 1A and 1B show signal waveforms when an image of a subject of a point source is captured.
Figure 1B:
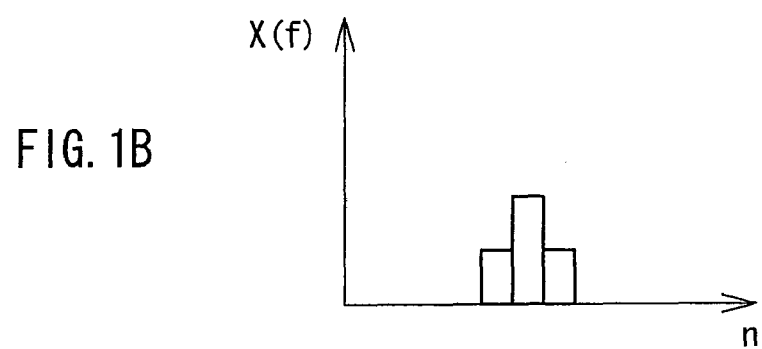
Figure 2A:
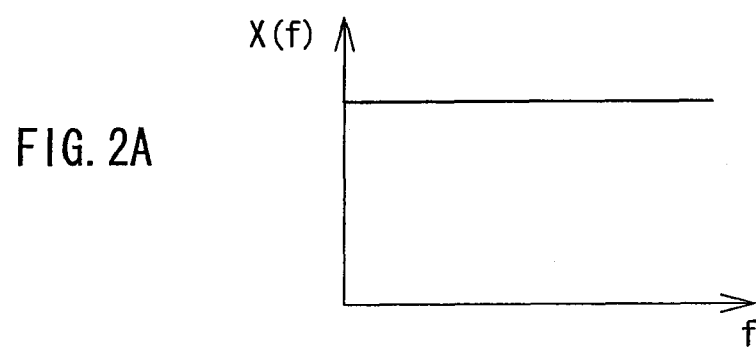
FIGS. 2A and 2B show frequency characteristics corresponding to the signal waveforms shown in FIGS. 1A and 1B.
Figure 2B:
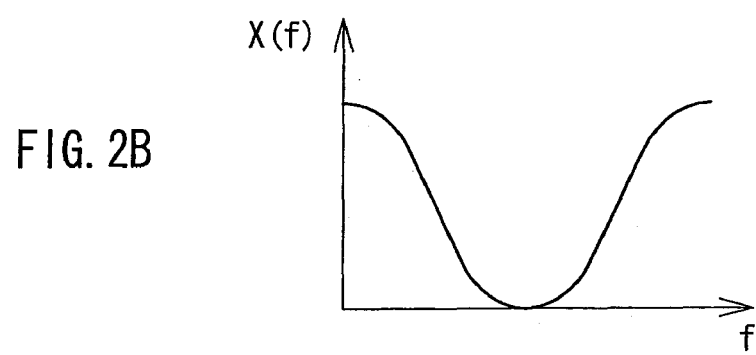

For describing the concept of camera shake correction by an image processing apparatus according to the present invention, FIGS. 1A and 1B show signal waveforms when an image of a subject of a point source is captured. The horizontal axis indicates a pixel position. The vertical axis indicates a signal level. Also, FIGS. 2A and 2B show frequency characteristics corresponding to the signal waveforms shown in FIGS. 1A and 1B. The horizontal axis indicates a frequency. The vertical axis indicates a signal level. Herein, for simplicity of description, a one-dimensional image is used. Although an actual image is in two dimensions, the principle of processing a one-dimensional image and that of processing a two-dimensional image are the same. Thus, the description directed to the one-dimensional image processing is applicable to that directed to the two-dimensional image processing.

FIG. 1A shows a waveform of an image signal in the case where no image degradation due to camera shake is present when capturing the image of the point source. Since no image degradation due to camera shake is present, the image signal shown in FIG. 1A has one point having a high signal level in the image. FIG. 2A shows the frequency characteristic corresponding to the image signal of the point source shown in FIG. 1A. Since no image degradation due to camera shake is present, the frequency characteristic shown in FIG. 2A is uniform from low to high frequencies.

FIG. 1B shows a waveform of an image signal in the case where three pixels of camera shake occur in an imaging apparatus when capturing the image of the point source. Since the waveform of the image signal shown in FIG. 1B is blunted due to the camera shake, the image based on this image signal is blurred. FIG. 2B shows the frequency characteristic corresponding to the image signal of the point source shown in FIG. 1B. Since the image is blurred due to the camera shake, the frequency characteristic shown in FIG. 2B is not uniform from low to high frequencies and is degraded.

In this way, the image degradation due to the camera shake can be considered as the degradation of the frequency characteristic of the image signal. Accordingly, in the present invention, by correcting the degradation of the frequency characteristic of the image signal, it is possible to restore an image that is degraded due to camera shake back to an image that is not degraded.

It should be noted, however, that the degradation of the frequency characteristic is influenced by the direction and magnitude of camera shake. In other words, in the image that is degraded due to the camera shake, its frequency characteristic in the direction of camera shake is degraded, but that in a direction perpendicular to the direction of camera shake is not degraded. Further, when the magnitude of camera shake is large, the image is blurred considerably. This means that, when the magnitude of camera shake is large, the frequency characteristic is degraded considerably. Accordingly, it is necessary to detect the influence of the direction and magnitude of camera shake and correct an image properly based on the result of detection.

Embodiment 1

1. Operation of Image Processing Apparatus

Figure 3:
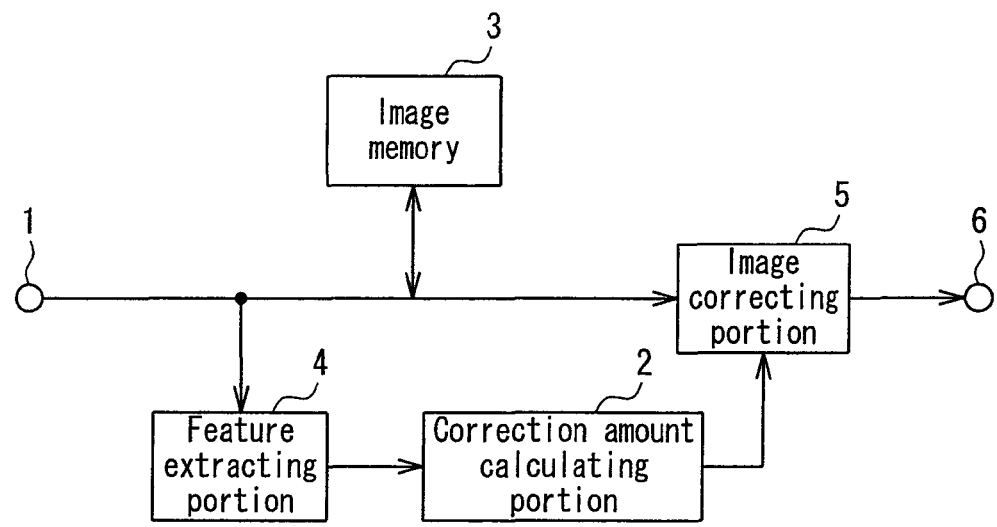
FIG. 3 is a block diagram showing a configuration of an image processing apparatus according to Embodiment 1.

FIG. 3 is a block diagram showing a configuration of an image processing apparatus according to Embodiment 1. In FIG. 3, an image signal that is captured by a digital camera or the like and converted to digital form is input to an input portion 1. The image signal to be input to the input portion 1 may be an image signal that is obtained by capturing an image using a digital camera and recording it in a recording medium or an image signal that is obtained by scanning a photograph taken using a film camera and converting the data to digital form.

A feature extracting portion 4 extracts a feature of a frequency characteristic of the image signal input to the input portion 1. A specific extraction method will be described later. Based on the feature of the frequency characteristic extracted by the feature extracting portion 4, a correction amount calculating portion 2 calculates a correction amount of the frequency characteristic. An image memory 3 temporarily stores the image signal input to the input portion 1. An image correcting portion 5 sequentially reads out the image signals stored in the image memory 3 and corrects the read-out image signal based on the correction amount calculated by the correction amount calculating portion 2.

Figure 4:
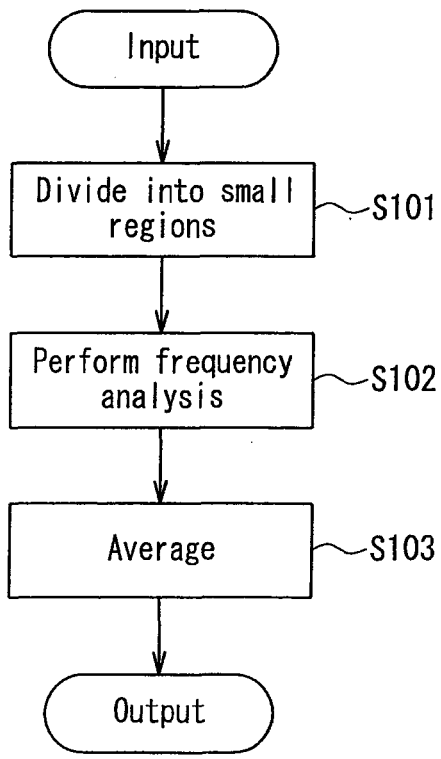
FIG. 4 is a flowchart showing an operation of a feature extracting portion in the image processing apparatus according to Embodiment 1.

The operation of the image processing apparatus according to Embodiment 1 will be described with reference to FIGS. 3 to 7. FIG. 4 is a flowchart showing an operation of the feature extracting portion 4 in the image processing apparatus according to Embodiment 1.

First, as shown in FIGS. 3 and 4, the feature extracting portion 4 divides an image based on the image signal input to the input portion 1 into small regions (for example, of about 8×8 dots) (S101). The size of the small regions depends on the amount of camera shake that needs correction. When the image is degraded considerably due to considerable camera shake, the size of the small regions has to be large.

Next, the feature extracting portion 4 performs a two-dimensional frequency analysis on image signals of the divided images (S102). The method of the two-dimensional frequency analysis can be Fourier transform, discrete cosine transform (DCT), wavelet transform or the like. In the above-noted frequency analysis, the image signals of the images of the small regions of 8×8 dots are transformed into frequency characteristics corresponding to the respective small regions of 8×8 dots.

Subsequently, the feature extracting portion 4 averages the frequency characteristics obtained for the respective small regions over the entire image (S103). The averaged frequency characteristics are output from the feature extracting portion 4 and input to the correction amount calculating portion 2.

Figure 5:
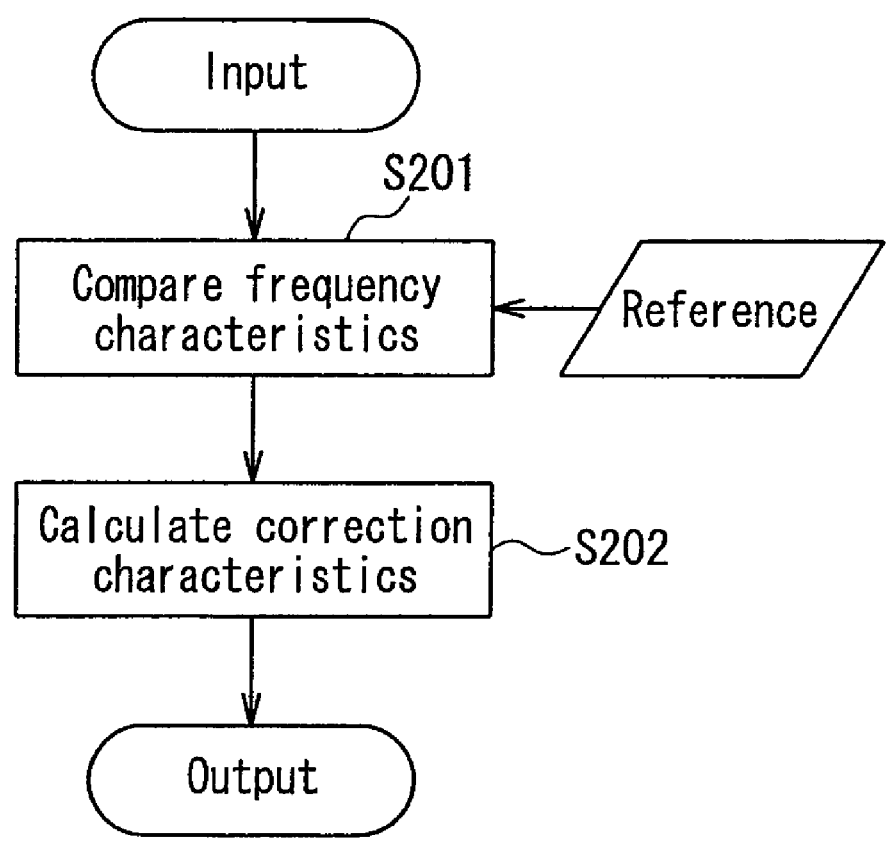
FIG. 5 is a flowchart showing an operation of a correction amount calculating portion in the image processing apparatus according to Embodiment 1.

Now, the operation of the correction amount calculating portion 2 will be described with reference to FIG. 5. FIG. 5 is a flowchart showing the operation of the correction amount calculating portion 2 in the image processing apparatus according to Embodiment 1.

As shown in FIGS. 3 and 5, the features of the frequency characteristics corresponding to the respective small regions of 8×8 dots extracted by the feature extracting portion 4 and a feature of a reference frequency characteristic are input to the correction amount calculating portion 2. The correction amount calculating portion 2 compares the features of the frequency characteristics output from the feature extracting portion 4 and the feature of the reference frequency characteristic (S201). Here, the "feature of the reference frequency characteristic" refers to a feature of a frequency characteristic of an image captured in the state where no camera shake is present in an imaging apparatus. Such a feature of the reference frequency characteristic can be obtained by capturing an image of a resolution chart or a chart for measuring a frequency characteristic in the state where the imaging apparatus is fixed to a tripod or the like.

It should be noted, however, that this feature of the reference frequency characteristic is not necessarily the feature of a frequency characteristic of an image captured in the state where no camera shake is present in the imaging apparatus. Also, by changing the feature of the reference frequency characteristic, it is possible not only to perform the camera shake correction but also adjust an image quality according to an image capturing condition, etc.

Next, the correction amount calculating portion 2 calculates the difference between each of the features of the frequency characteristics output from the feature extracting portion 4 and the feature of the reference frequency characteristic. Then, the correction amount calculating portion 2 performs a frequency inverse transform of the calculated differences so as to calculate correction characteristics as filter characteristics of 8×8 dots (S202). The correction characteristics calculated by the correction amount calculating portion 2 are input to the image correcting portion 5.

The image correcting portion 5 performs a filter processing on an original signal read out from the image memory 3 so as to correct a frequency characteristic of the original signal based on the correction characteristics calculated by the correction amount calculating portion 2.

2. Specific Operation of Correcting Frequency Characteristic

FIGS. 6A to 6E show waveforms of image signals when an image of a subject of a point source is captured by the image processing apparatus according to Embodiment 1. Also, FIGS. 7A to 7E show frequency characteristics of the image signals shown in FIGS. 6A to 6E. Herein, for simplicity of description, the description assumes that the image is in one dimension. Although an actual image is in two dimensions, the principle of processing a two-dimensional image is the same as that of processing a one-dimensional image. Thus, it is appropriate to apply description directed to the one-dimensional image processing to that directed to the two-dimensional image processing.

Figure 6A:
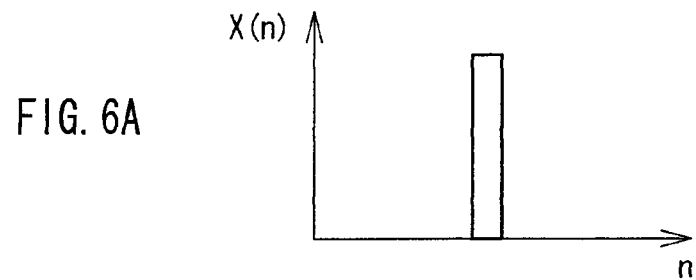
FIGS. 6A to 6E show signal waveforms of an image of a subject of a point source captured by the image processing apparatus according to Embodiment 1.
Figure 7A:
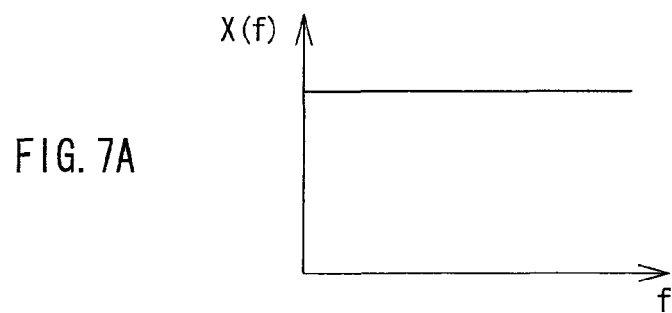
FIGS. 7A to 7E show frequency characteristics corresponding to the signal waveforms shown in FIGS. 6A to 6E.

FIG. 6A shows a waveform of an image signal obtained when the image of the point source is captured using an imaging apparatus in which no camera shake is present. No image degradation due to camera shake is present, so that the image signal of the point source is present at one point. As shown in FIG. 7A, since no image degradation due to camera shake is present, the frequency characteristic is uniform from low to high frequencies. Incidentally, although FIG. 7A shows an ideal frequency characteristic of the image signal obtained when the image of the point source is captured, the uniform frequency characteristic as shown in FIG. 7A is not always obtained depending on the frequency characteristic of the imaging apparatus used for image capturing. Herein, the frequency characteristic shown in FIG. 7A is used as the feature of the reference frequency characteristic in the present invention.

Figure 6B:
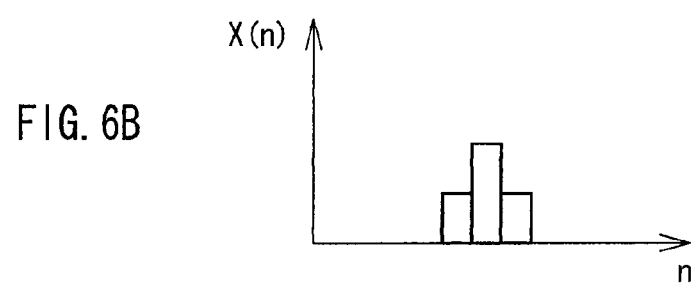
Figure 7B:
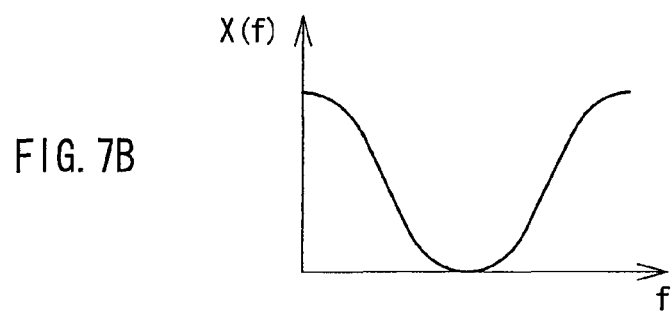

FIG. 6B shows a waveform of an image signal obtained when the image of the point source is captured by an imaging apparatus in which three pixels of camera shake occur. Since the camera shake is present in the imaging apparatus, the waveform of the image signal is blunted, so that the image based on this image signal is blurred. As shown in FIG. 7B, the camera shake present in the imaging apparatus causes the degradation of the frequency characteristics at high frequencies.

Figure 6C:
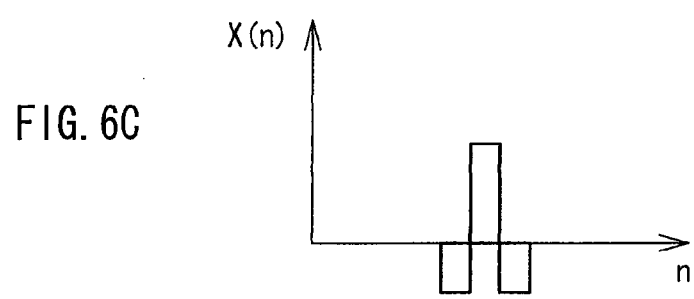
Figure 7C:
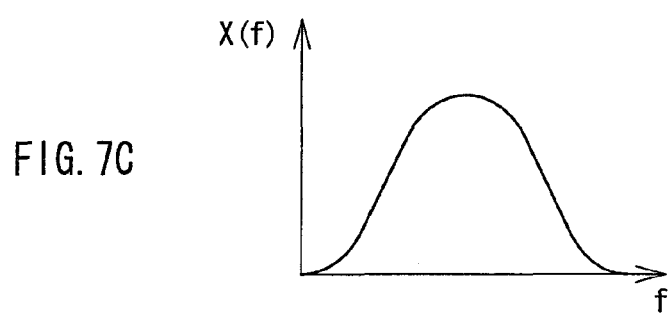

FIG. 7C shows the difference between the frequency characteristic shown in FIG. 7A and the frequency characteristic shown in FIG. 7B. The difference shown in FIG. 7C corresponds to a degradation amount of a high frequency component in the image. FIG. 6C shows a signal waveform obtained by frequency inverse transform of the degradation amount of the frequency characteristic shown in FIG. 7C from a frequency domain to a space domain.

Figure 6D:
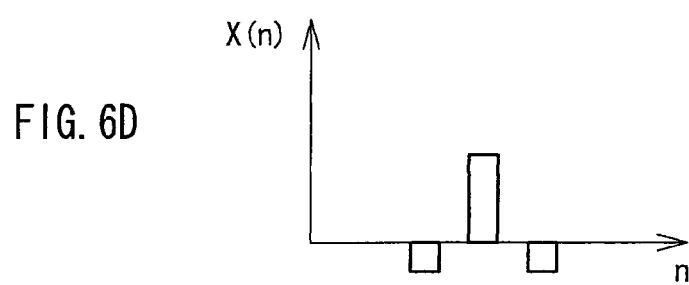
Figure 7D:
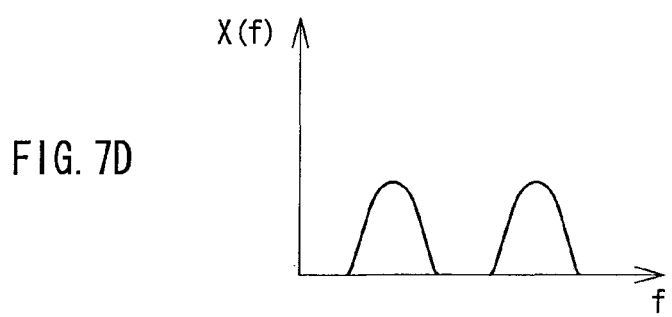

A pulse train in the space domain obtained by the frequency inverse transform corresponds to an impulse response providing the degradation amount caused by camera shake. This impulse response (see FIG. 6C) is convoluted to the original signal (see FIG. 6B), thereby obtaining a signal approximate to the degraded signal component. FIG. 6D shows a signal waveform obtained by the convolution processing. FIG. 7D shows a frequency characteristic of the signal obtained by the convolution processing.

Figure 6E:
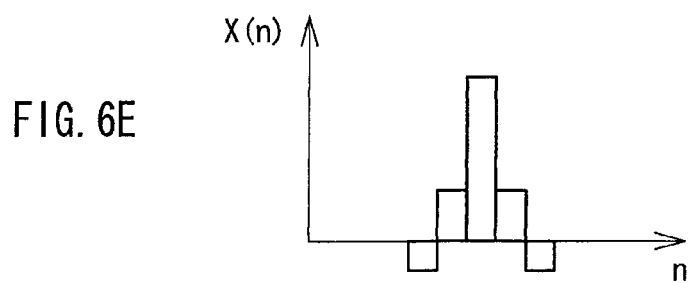
Figure 7E:
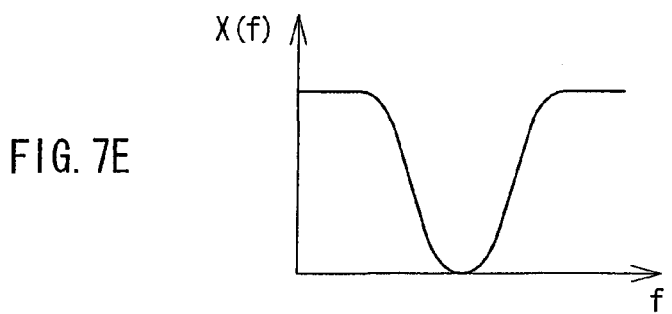

By adding the degraded signal component shown in FIG. 6D to the original signal (see FIG. 6B), it is possible to restore an image approximate to an original image before being degraded due to the camera shake (see FIG. 6A). FIG. 6E shows a signal waveform of an image signal obtained by the restoring processing. FIG. 7E shows a frequency characteristic of the image signal shown in FIG. 6E.

In Embodiment 1, the processing of restoring the image degraded by the camera shake has been described using the one-dimensional signal. However, when two-dimensional frequency transformation is carried out, it also is possible to restore the image by a processing similar to the above.

3. Effects of Embodiment, etc

As described above, according to Embodiment 1, the feature extracting portion 4 for extracting the feature of the frequency characteristic of an image signal that is input, the correction amount calculating portion 2 for calculating the correction amount of the frequency characteristic from the feature extracted by the feature extracting portion 4, and the image correcting portion 5 for correcting the frequency characteristic of the image signal according to the correction amount calculated by the correction amount calculating portion 2 are provided. Therefore, it is possible to extract the degradation amount of the frequency characteristic of the image signal due to camera shake and improve the frequency characteristic according to that degradation amount of the frequency characteristic. Consequently, an image can be restored by a proper correction processing.

Embodiment 2

1. Operation of Image Processing Apparatus

The feature extracting portion 4 in Embodiment 1 is capable of analyzing the frequency characteristics for the individual small regions in the image and averaging the frequency characteristics of the individual small regions over the entire screen. In contrast, the feature extracting portion 4 in Embodiment 2 is capable of analyzing the frequency characteristics for the individual small regions in the image and extracting maximum values over the entire screen based on the frequency characteristics of the individual small regions. The image processing according to Embodiment 2 makes it possible to extract accurately the degradation amount of the frequency characteristic due to camera shake in the image signal input to the image processing apparatus.

The configuration of the image processing apparatus according to Embodiment 2 is similar to that according to Embodiment 1, and thus, the detailed description thereof will be omitted. In the following, the operation of the image processing apparatus according to Embodiment 2 will be described with reference to FIGS. 3 and 8 to 12.

Figure 8:
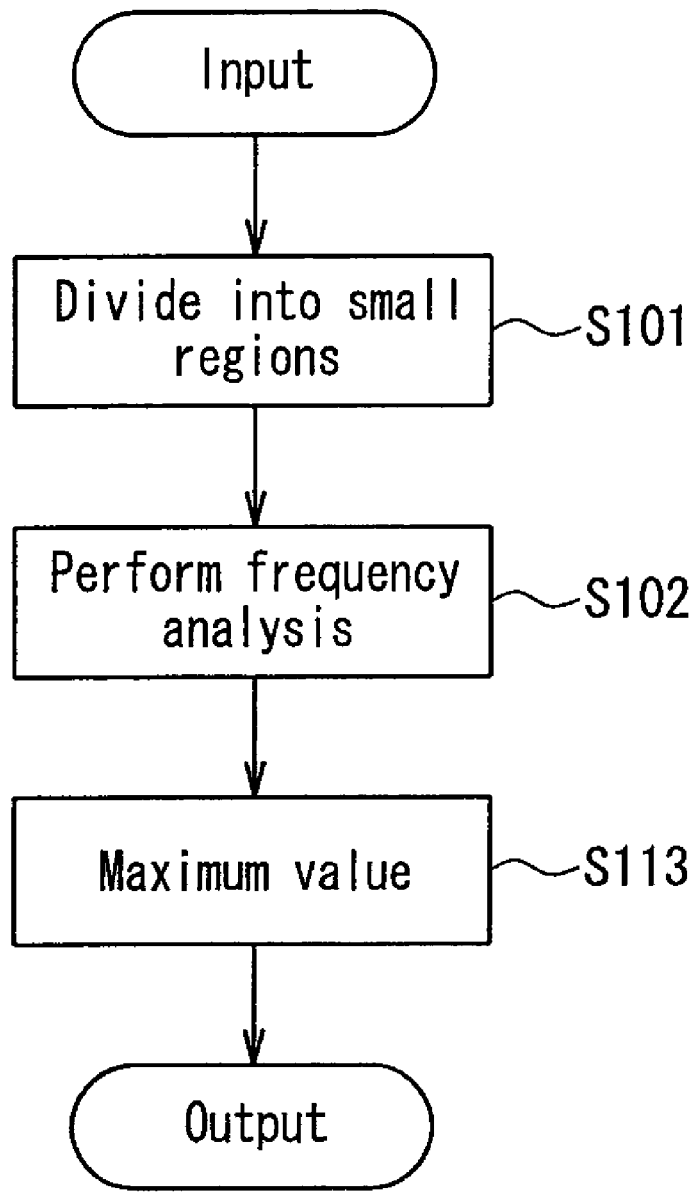
FIG. 8 is a flowchart showing an operation of a feature extracting portion in the image processing apparatus according to Embodiment 2.

FIG. 8 is a flowchart showing an operation of the feature extracting portion 4 in the image processing apparatus according to Embodiment 2. In FIG. 8, steps performing an operation similar to Embodiment 1 are given the same reference numerals, and the description thereof will be omitted.

The feature extracting portion 4 divides an image based on the image signal input to the input portion 1 into small regions (for example, of about 8×8 dots) (S101). Next, the feature extracting portion 4 performs a two-dimensional frequency analysis on image signals of the divided small regions (S102).

Subsequently, the feature extracting portion 4 extracts maximum values of the frequency characteristics obtained respectively in the small regions of 8×8 dots over the entire image (S113). The "maximum values" are sets of the largest frequency characteristics of the small regions among the frequency characteristics obtained for the individual small regions of 8×8 (=64) dots over the entire image.

Figures 9A, 9B:
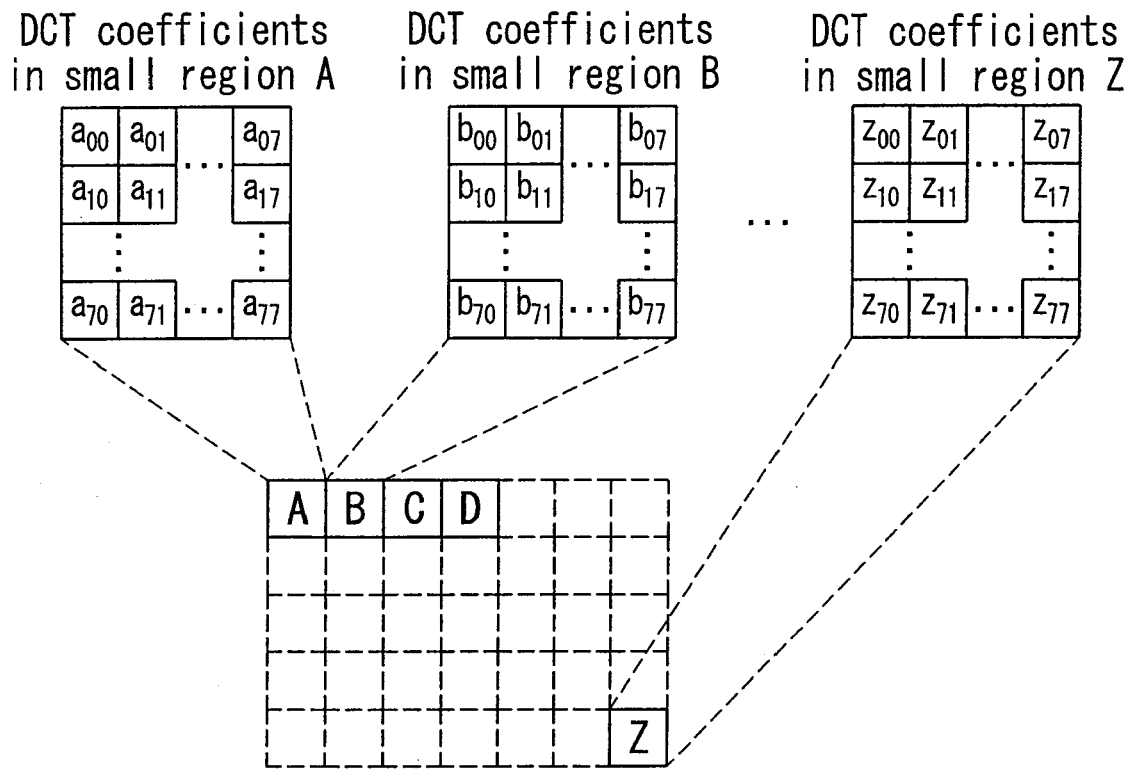
FIGS. 9A and 9B are views for describing maximum values in Embodiment 2.

FIGS. 9A and 9B are views for describing the maximum values. As shown in FIG. 9A, an image is divided into small regions A to Z of 8×8 dots. A signal of each small region is subjected to a discrete cosine transform (DCT), for example, whereby 8×8 DCT coefficients $a_{ij}$ to $z_{ij}$ (i=0 to 7, j=0 to 7) are obtained. The maximum value is calculated by $$Max_{ij} = Max(a_{ij}, b_{ij}, \ldots, z_{ij})$$

for respective subscripts i and j indicating the small region. Here, Max( ) indicates a maximum value of an argument in ( ). FIG. 9B shows the maximum values calculated for the individual small regions. The thus obtained maximum values for the respective frequencies are output from the feature extracting portion 4 and input to the correction amount calculating portion 2.

Figure 10:
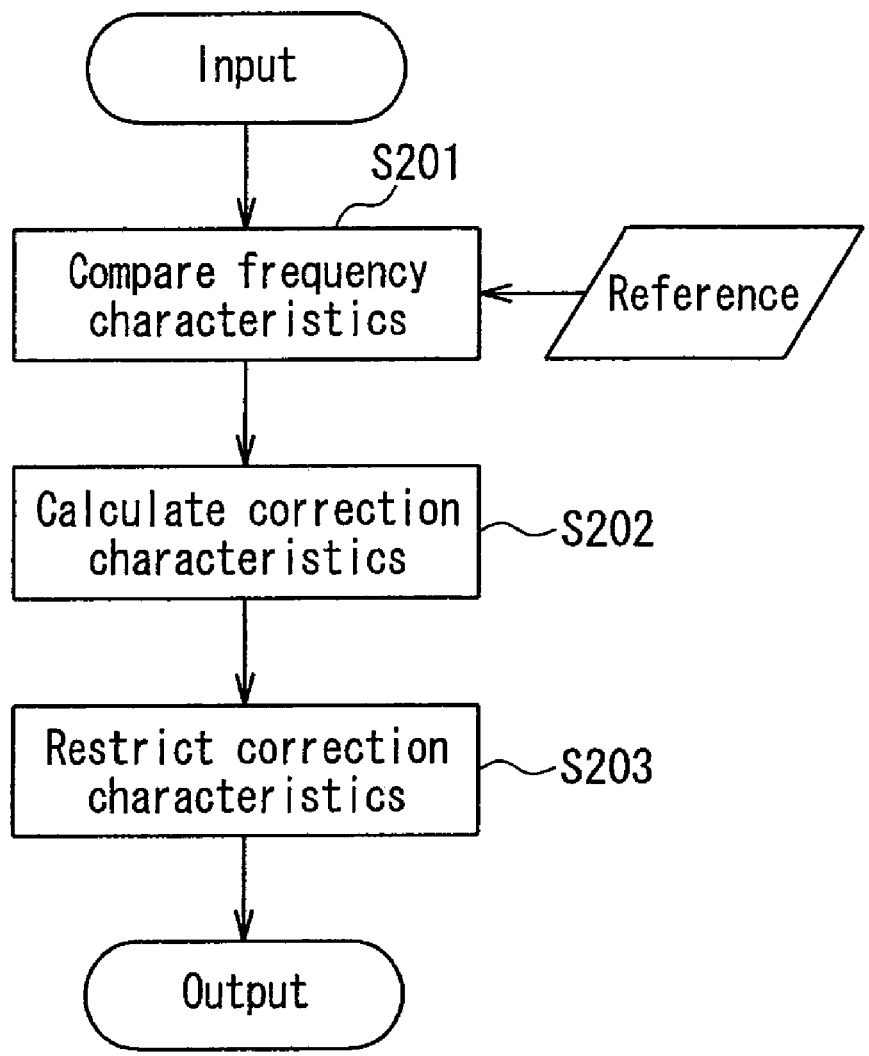
FIG. 10 is a flowchart showing an operation of a correction amount calculating portion in the image processing apparatus according to Embodiment 2.

Now, the operation of the correction amount calculating portion 2 will be described with reference to FIG. 10. FIG. 10 is a flowchart showing the operation of the correction amount calculating portion 2 in the image processing apparatus according to Embodiment 2. In FIG. 10, steps performing an operation similar to Embodiment 1 are given the same reference numerals, and the description thereof will be omitted.

First, the correction amount calculating portion 2 compares the features of the frequency characteristics of 8×8 dots extracted by the feature extracting portion 4 and the feature of the reference frequency characteristic (S201).

Next, the correction amount calculating portion 2 calculates the difference between each of the features of the frequency characteristics of 8×8 dots and the feature of the reference frequency characteristic. Then, the correction amount calculating portion 2 performs a frequency inverse transform of the calculated differences so as to calculate correction characteristics. The calculated correction characteristics are filter characteristics of 8×8 dots (S202).

Subsequently, the correction amount calculating portion 2 restricts the calculated correction characteristics under a specific condition (S203). The specific condition for restricting the correction characteristics is set to a degree in which the calculated correction characteristics do not cause an amplitude of an original signal corrected by the image correcting portion 5 to exceed an amplitude of the original signal before the correction, for example.

The correction characteristics calculated by the correction amount calculating portion 2 in this manner are output from the correction amount calculating portion 2 and input to the image correcting portion 5.

The image correcting portion 5 performs a filter processing on an original signal read out from the image memory 3 so as to correct a frequency characteristic of the original signal based on the correction characteristics calculated by the correction amount calculating portion 2.

2. Specific Operation of Correcting Frequency Characteristic

FIG. 11A to 11F show waveforms of image signals when an image of a subject of a point source is captured by the image processing apparatus according to Embodiment 2. Also, FIGS. 12A to 12F show frequency characteristics of the image signals shown in FIGS. 11A to 11F. Incidentally, in Embodiment 2, the description similar to Embodiment 1 will be omitted.

Figure 11A:
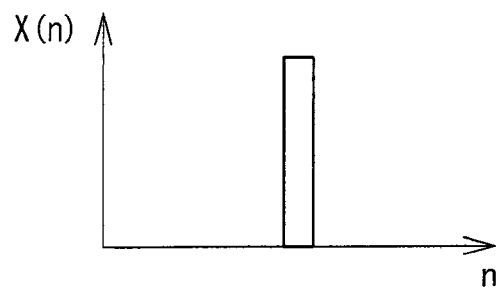
FIGS. 11A to 11F show signal waveforms of an image of a subject of a point source captured by the image processing apparatus according to Embodiment 2.
Figure 11B:
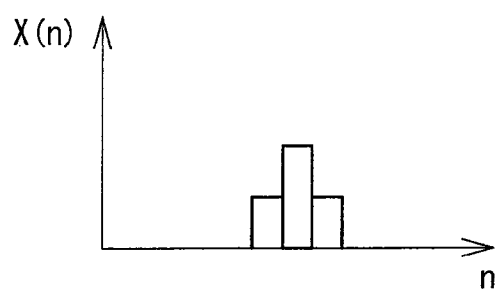
Figure 12A:
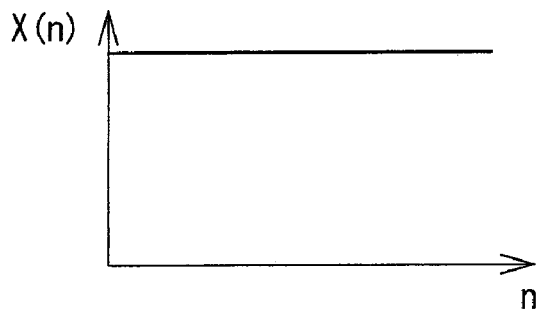
FIGS. 12A to 12F show frequency characteristics corresponding to the signal waveforms shown in FIGS. 11A to 11F.
Figure 12B:
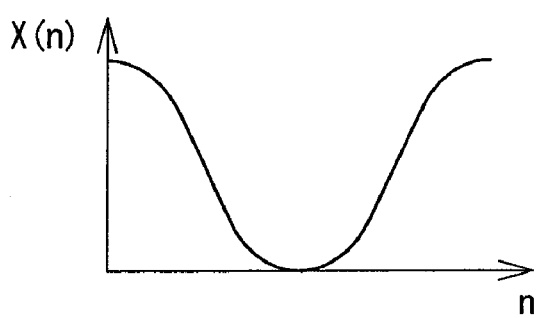

FIG. 11A shows a waveform of an image signal when the image of the point source is captured using an imaging apparatus in which no camera shake is present. FIG. 12A shows a frequency characteristic of the image signal shown in FIG. 11A. FIG. 11B shows a waveform of an image signal when the image of the point source is captured by an imaging apparatus in which three pixels of camera shake occur. FIG. 12B shows a frequency characteristic of the image signal shown in FIG. 11B.

Figure 11C:
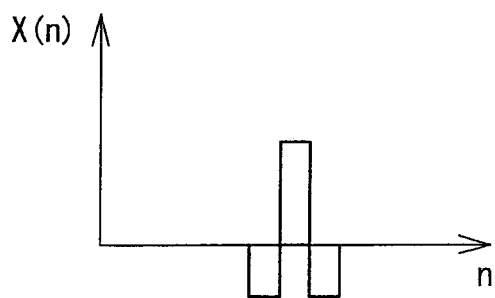
Figure 12C:
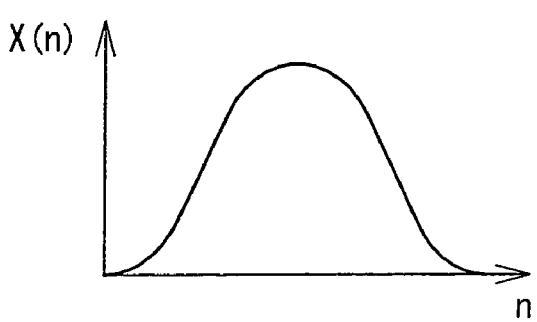

FIG. 12C shows the difference between the frequency characteristic shown in FIG. 12A and the frequency characteristic shown in FIG. 12B. FIG. 11C shows a waveform of a signal (a correction characteristic) obtained by frequency inverse transform of the difference in the frequency characteristics shown in FIG. 12C from a frequency domain to a space domain.

Figure 11D:
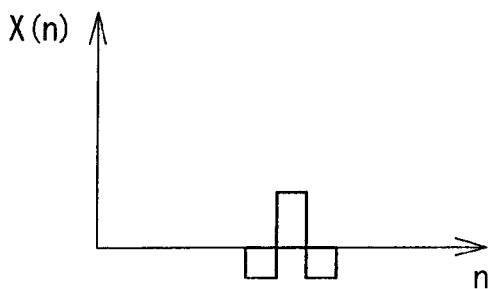
Figure 12D:
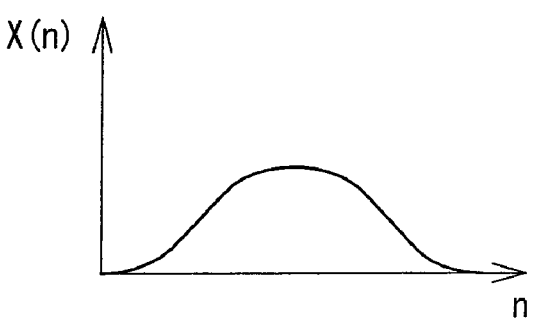

FIG. 11D shows a waveform of a correction characteristic whose magnitude is restricted with respect to the correction characteristic shown in FIG. 11C. FIG. 12D shows a frequency characteristic of the correction characteristic shown in FIG. 11D. Here, the frequency characteristic shown in FIG. 11D is a characteristic obtained by suppressing the magnitude of the correction characteristic shown in FIG. 11C to ½.

Figures 11E, 11F:
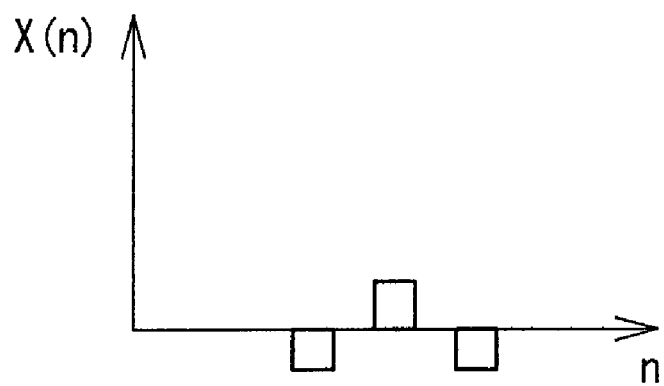
Figure 12E:
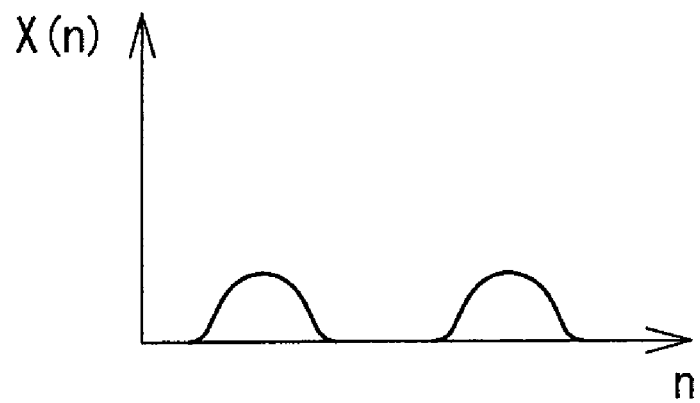

The correction characteristic shown in FIG. 11D (a pulse train in the space domain) corresponds to an impulse response providing the degradation amount caused by camera shake. This impulse response (see FIG. 11D) is convoluted to the original signal (see FIG. 11B), thereby obtaining a signal approximate to the degraded signal component. FIG. 11E shows a waveform of an image signal obtained by the convolution processing. FIG. 12E shows a frequency characteristic of the image signal shown in FIG. 11E.

Figure 12F:
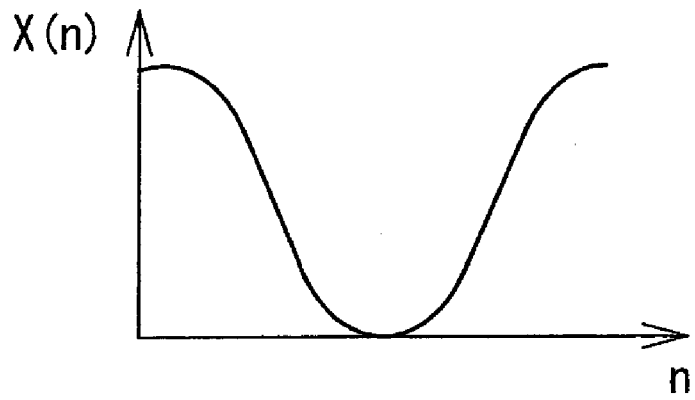

By adding the signal component shown in FIG. 11E to the original signal (see FIG. 11B), it is possible to restore an image approximate to an original image before being degraded due to the camera shake (see FIG. 11A). FIG. 11F shows a waveform of an image signal obtained by the restoring processing. FIG. 12F shows a frequency characteristic of the image signal shown in FIG. 11F.

In Embodiment 2, the processing of restoring the image degraded by the camera shake has been described using the one-dimensional signal. However, when two-dimensional frequency transformation is carried out, it also is possible to restore the image by a processing similar to the above.

The following is an explanation of the concept of the frequency characteristics in a two-dimensional image in the image processing apparatus according to Embodiment 2.

Figure 13:
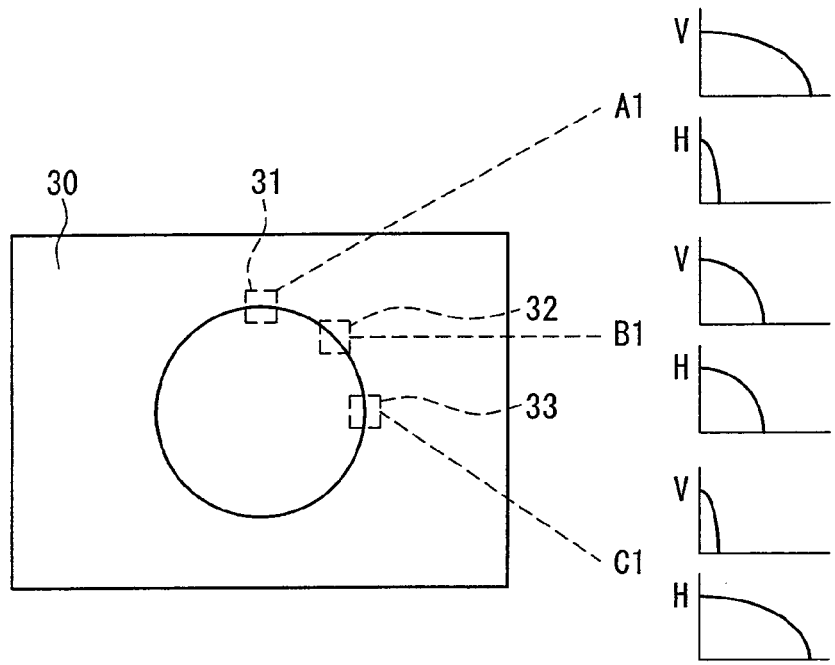
FIG. 13 schematically shows the relationship between an image and frequency characteristics in the image processing apparatus according to Embodiment 2 when no camera shake is present.
Figure 14:
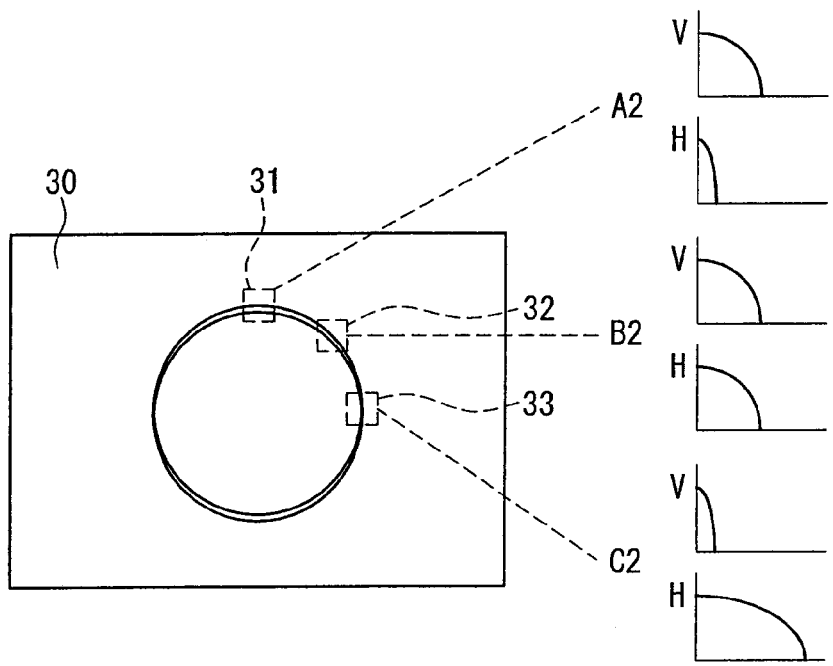
FIG. 14 schematically shows the relationship between an image and frequency characteristics in the image processing apparatus according to Embodiment 2 when vertical camera shake occurs.

FIGS. 13 and 14 are schematic views each showing the relationship between an image and frequency characteristics in the image processing apparatus according to Embodiment 2. FIG. 13 shows an image of a circular subject captured using an imaging apparatus in which no camera shake is present. FIG. 14 shows an image of the circular subject captured using the imaging apparatus in which vertical camera shake is present.

As shown in FIG. 14, when the imaging apparatus is shaken vertically, a horizontal line in the photographed image 30 is blurred. In FIGS. 13 and 14, a region 31 contains a horizontal line portion of the circular subject. A region 32 contains a slanting line portion of the circular subject. A region 33 contains a vertical line portion of the circular subject. Further, characteristics A1 and A2 each show a vertical frequency characteristic (V) and a horizontal frequency characteristic (H) in the region 31 in the image 30. Characteristics B1 and B2 show frequency characteristics in the region 32. Characteristics C1 and C2 show frequency characteristics in the region 33. In the frequency characteristics indicated by V and H, the horizontal axis indicates a frequency, and the vertical axis indicates a signal level. Since the subject is circular in the present embodiment, the images of the portions in the regions 31 to 33 have curved lines. However, for convenience of description, it is assumed in the following that the images of the portions in the regions 31 to 33 respectively have straight lines.

Since the image of the portion in the region 31 in FIG. 13 is the horizontal line, it has a high vertical frequency characteristic and a low horizontal frequency characteristic as shown in the characteristic A1. Since the image of the portion in the region 32 in FIG. 13 is the slanting line, it has slightly low vertical and horizontal frequency characteristics as shown in the characteristic B1. Since the image of the portion in the region 33 in FIG. 13 is the vertical line, it has a high horizontal frequency characteristic and a low vertical frequency characteristic as shown in the characteristic C1.

On the other hand, as shown in FIG. 14, when the image 30 is blurred vertically due to camera shake, the frequency characteristics of the images of the portions in the regions 32 and 33 shown in the characteristics B2 and C2 are similar to those shown in the characteristics B1 and C1 in FIG. 13. However, the vertical frequency characteristic of the image of the portion in the region 31 shown in the characteristic A2 is lower than that shown in the characteristic A1.

Here, when maximum values of the vertical and horizontal frequency characteristics are compared, a position at which the vertical frequency characteristic is maximal is in the region 31 (the characteristic A1) and a position at which the horizontal frequency characteristic is maximal is in the region 33 (the characteristic C1) in the image shown in FIG. 13, which is not degraded due to camera shake. In the image shown in FIG. 14, which is degraded due to camera shake, a position at which the vertical frequency characteristic is maximal is in the region 31 (the characteristic A2) and a position at which the horizontal frequency characteristic is maximal is in the region 33 (the characteristic C2). However, as shown in the characteristics A1 and A2, there is a difference in the maximum values of the vertical frequency characteristics due to the camera shake. The image correcting portion 5 is capable of correcting the degradation of the frequency characteristic as shown in the characteristic A2, thereby restoring an image in which the degradation due to camera shake is suppressed.

3. Effects of Embodiment, etc

As described above, in accordance with Embodiment 2, the feature extracting portion 4 is configured to analyze the frequency characteristics for the individual small regions in the image and extract the maximum values of the frequency characteristics of the individual small regions over the entire screen, so that the degradation amount of the frequency characteristic due to camera shake can be detected accurately. Thus, by improving the frequency characteristic according to the degradation amount of the frequency characteristic detected by the feature extracting portion 4, it is possible to perform a proper correction, thereby restoring an image in which the degradation due to camera shake is suppressed.

Figure 15:
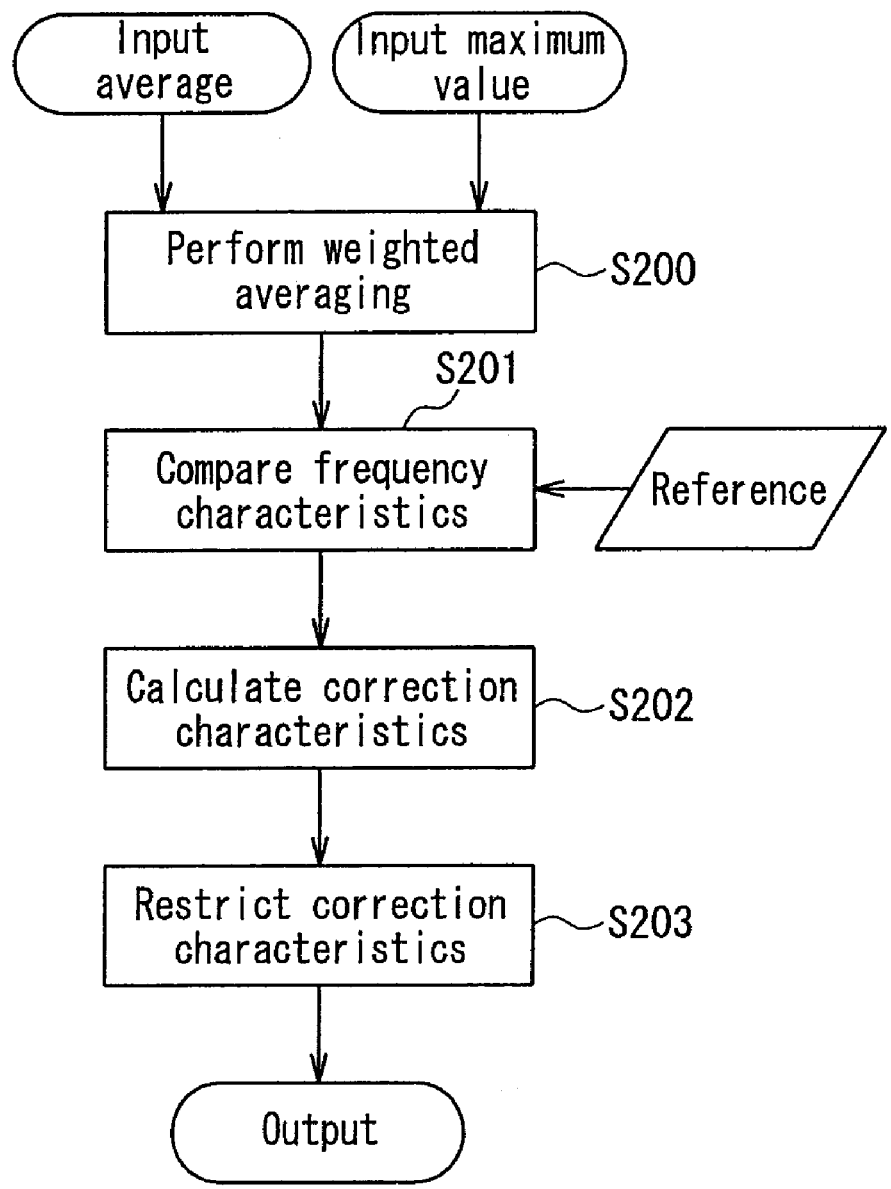
FIG. 15 is a flowchart showing an operation of a feature extracting portion in the image processing apparatus according to another embodiment.

Incidentally, in Embodiments 1 and 2, the feature extracting portion 4 analyzes the frequency characteristics for the individual small regions in the image and uses the averages or the maximum values of the frequency characteristics of the individual small regions over the entire screen. However, both of the averages and the maximum values may be used as shown in FIG. 15. FIG. 15 is a flowchart in which a step of performing weighted averaging (S200) is added prior to S201 in the flowchart shown in FIG. 10. In this case, for example, the weighted average of the average and the maximum value serves as a new feature of the frequency characteristic obtained by the computation of the average and the maximum value in the present invention.

This configuration makes it possible to grasp the features of the frequency characteristics over the entire image, so that a camera shake correction that is impervious to the frequency characteristic in a part of the subject can be achieved. Further, the degradation amount of the frequency characteristic due to camera shake can be extracted accurately.

Figure 16:
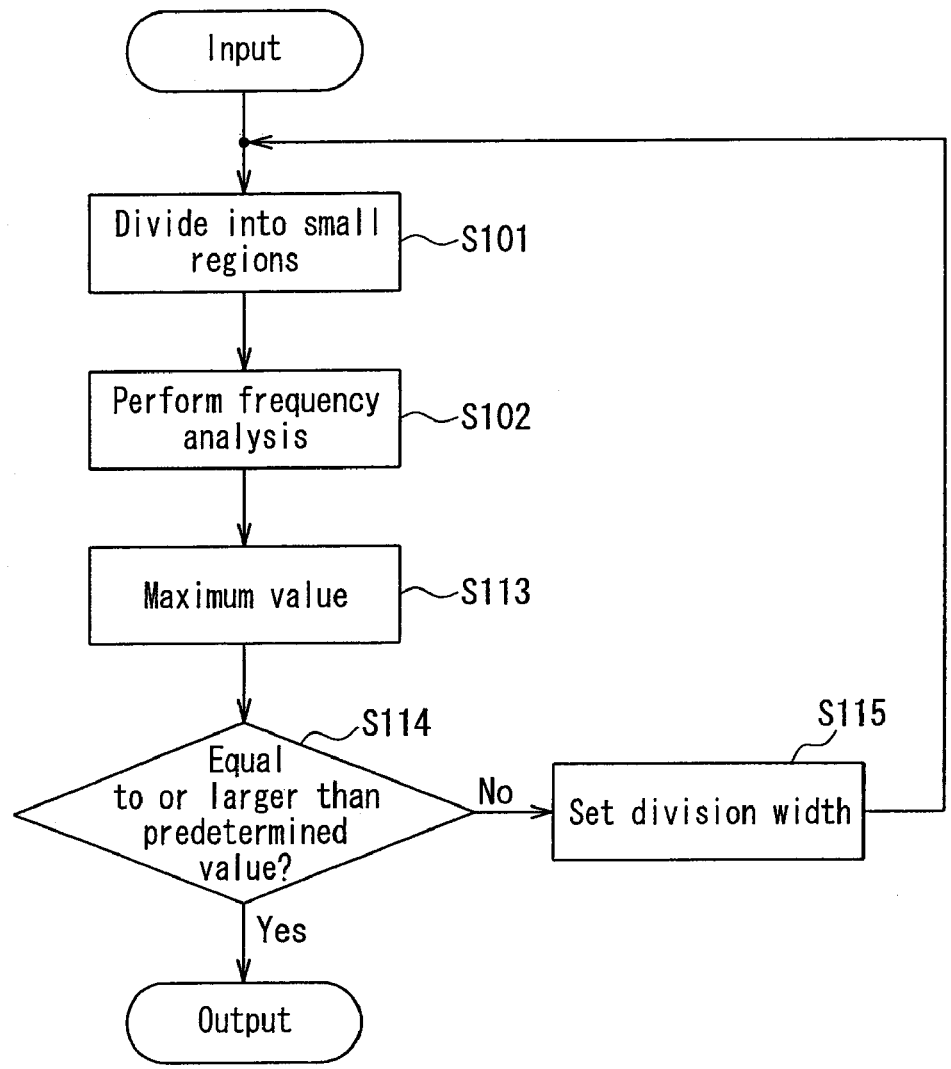
FIG. 16 is a flowchart showing another operation of a correction amount calculating portion in the image processing apparatus according to another embodiment.

Moreover, although the size of the small regions is 8×8 dots in Embodiments 1 and 2, it also may be changed depending on conditions as shown in FIG. 16. FIG. 16 is a flowchart in which a step of comparing the maximum value and a reference value (S114) and a step of setting a division width for the small regions in the case where the maximum value is smaller than the reference value (S115) are added to the flowchart shown in FIG. 8. The amount of camera shake that can be extracted depends on the size of the small regions set by the feature extracting portion 4. For example, when the frequency characteristics are degraded greatly due to camera shake in the small regions of 8×8 dots, the amount of camera shake sometimes exceeds the individual small regions of 8×8 dots. In that case, for example, the maximum value obtained in S113 and a predetermined value serving as a feature of a second reference frequency characteristic are compared, and if the former is smaller than the latter, the size of the small regions is changed to 16×16 dots, for example. It should be noted, however, that a computation amount usually is smaller when the amount of camera shake is extracted with smaller small regions.

The processing as shown in FIG. 16 makes it possible to correct the degradation of the image (the degradation of the frequency characteristic) due to camera shake properly even when the imaging apparatus has a large amount of camera shake.

Moreover, although the feature of the reference frequency characteristic is the feature of the frequency characteristic of the imaging apparatus in which no camera shake is present in Embodiments 1 and 2, it also can be set to be larger than the feature of the frequency characteristic of the imaging apparatus. With this configuration, since the frequency characteristic of the image signal input to the input portion 1 is corrected in such a manner as to be brought closer to the reference frequency characteristic, the quality of the image can be improved. In other words, in the present invention, the feature of the detected frequency characteristic is corrected in such a manner as to be brought closer to the feature of the set reference frequency characteristic. Thus, the feature of the reference frequency characteristic is emphasized or attenuated at a specific frequency with respect to the feature of the frequency characteristic of the imaging apparatus, thereby achieving an image quality closer to a desired quality.

Furthermore, in Embodiments 1 and 2, the signal corrected by the correction amount calculating portion 2 mainly is formed of a high frequency component and contains a lot of noise components. Accordingly, by suppressing a small amplitude component in the corrected original signal, it is possible to suppress the noise component, thereby achieving a restored image with less noise.

Embodiment 3

1. Configuration of Image Processing Apparatus

Figure 17:
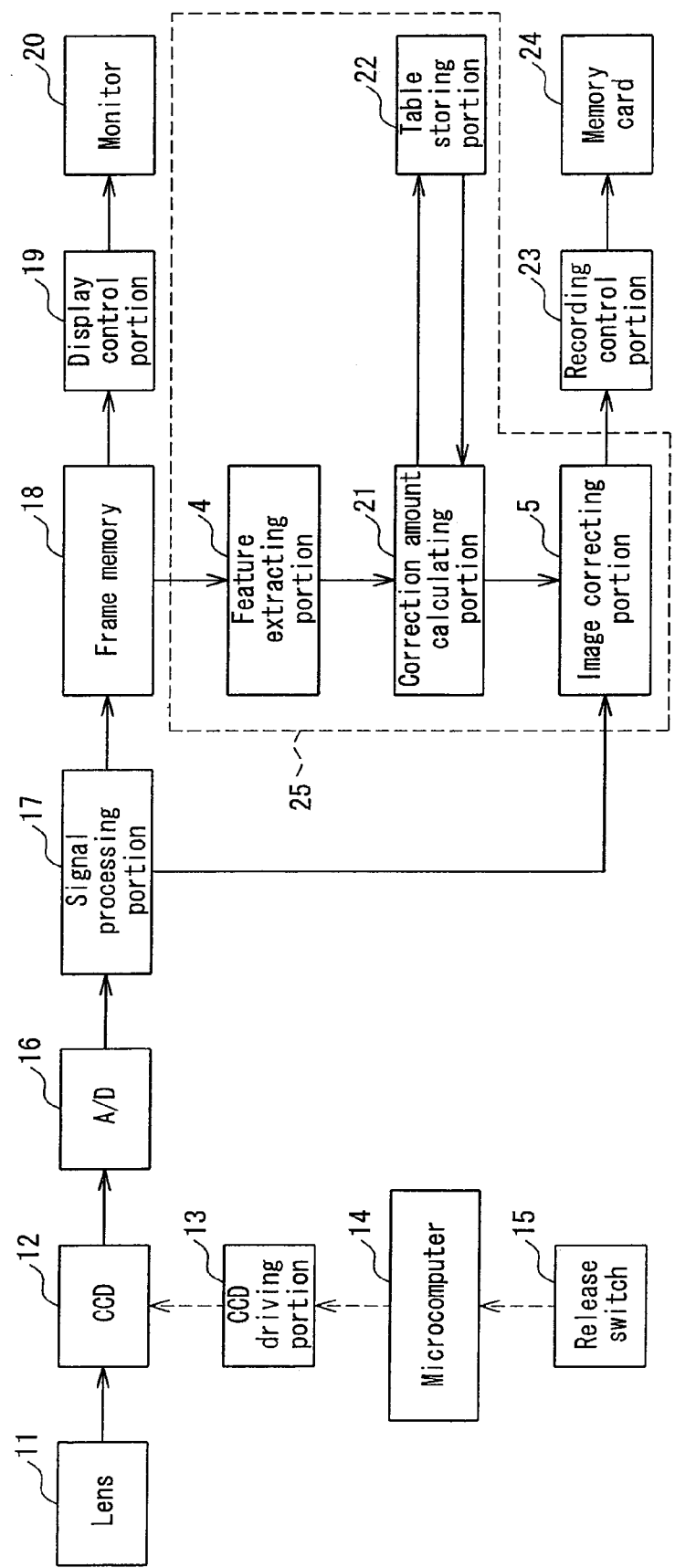
FIG. 17 is a block diagram showing a configuration of an image processing apparatus according to Embodiment 3.

FIG. 17 shows a configuration of an imaging apparatus, which is an example of an image processing apparatus according to Embodiment 3. In FIG. 17, configurations similar to those in Embodiment 1 or 2 are given the same reference numerals, and the description thereof will be omitted. The image processing apparatus illustrated in Embodiment 3 is mounted in a digital camera.

A CCD image sensor 12 includes a large number of photoelectric conversion elements (pixels) in a matrix form, and converts an optical image that enters via a lens 11 into an electric image and outputs this electric image. Also, the CCD image sensor 12 is operable in a pixel mixing driving mode (a first driving mode) or an all-pixel readout mode (a second driving mode). The pixel mixing driving mode adds values of a plurality of pixels arranged horizontally and vertically and outputs the sum, and substantially thins out the pixels so as to give the output with a reduced resolution. The all-pixel readout mode outputs pixel signals from all of the photoelectric conversion elements without thinning out the pixel signals output from the photoelectric conversion elements. Thus, an image obtained when operating the CCD image sensor 12 in the all-pixel readout mode has a higher resolution than that obtained when operating it in the pixel mixing driving mode.

A CCD driving portion 13 is capable of driving the CCD image sensor 12 with a control signal output from a microcomputer 14. More specifically, the CCD driving portion 13 controls the CCD image sensor 12 to operate in either the pixel mixing driving mode or the all-pixel readout mode and controls an exposure operation. Incidentally, the CCD driving portion 13 makes the CCD image sensor 12 operate in the pixel mixing driving mode when the imaging apparatus according to Embodiment 3 is in a monitor mode and makes the CCD image sensor 12 operate in the all-pixel readout mode at the time of release. The "monitor mode" is a mode in which a moving image (a so-called "through image") is displayed on a monitor 20 mounted in the imaging apparatus while continuing to output image signals from the CCD image sensor 12 periodically.

The microcomputer 14 (a control portion) instructs the CCD driving portion 13 to switch between the pixel mixing driving mode and the all-pixel readout mode. At the time of the pixel mixing driving mode, since the pixel signals are mixed according to predetermined combinations and then output, the pixel signals from which a certain number of horizontal and vertical pixels are thinned out as compared with the all-pixel readout mode are read out. Further, the microcomputer 14 is capable of controlling the operation of the CCD driving portion 13 with a control signal output from a release switch 15.

An analog-to-digital converter portion (in the following, referred to as an A/D converter portion) 16 converts an analog image signal output from the CCD image sensor 12 to a digital image signal. The digitized image signal output from the A/D converter portion 16 is input to a signal processing portion 17.

The signal processing portion 17 subjects the image signal output from the A/D converter portion 16 to various image processings such as noise removal. When the imaging apparatus is in the monitor mode, the image signal is output from the signal processing portion 17 to a frame memory 18. When a user operates the release switch 15, the image signal is output from the signal processing portion 17 to the frame memory 18 and the image correcting portion 5.

Incidentally, an imaging system is configured by the CCD image sensor 12, the CCD driving portion 13, the A/D converter portion 16 and the signal processing portion 17.

The frame memory 18 (an image storing portion) temporarily stores the image signal output from the signal processing portion 17. When the imaging apparatus is in the monitor mode, the frame memory 18 periodically outputs the stored image signal to a display control portion 19. When the release switch 15 is operated, an image signal immediately before the image signal obtained by the CCD image sensor 12 operating in the all-pixel readout mode is written in the frame memory 18 (the image signal obtained by the CCD image sensor 12 operating in the pixel mixing driving mode) is output to the feature extracting portion 4. It should be noted that the image storing portion is not limited to the frame memory 18 but may be other means as long as it is capable of storing the image signal.

The display control portion 19 converts the image signal output from the frame memory 18 to an image signal that can be displayed on the monitor 20 and outputs this image signal to the monitor 20. The monitor 20 is configured by, for example, a liquid crystal monitor.

In a table storing portion 22 (a correspondence output portion), a frequency characteristic table corresponding to frequency characteristics of the image signals obtained when the CCD image sensor 12 operates in the pixel mixing driving mode is prestored. In other words, in the table storing portion 22, features of the frequency characteristics output from the feature extracting portion 4 (features of the frequency characteristics of the image signals in the monitor mode) and features of frequency characteristics for image correction corresponding to these features of the frequency characteristics (ideal values) are listed in the table and stored. In the following, the features of the frequency characteristics for image correction stored in the table storing portion 22 are referred to as the "features of the reference frequency characteristics." Incidentally, since the frequency characteristics of an image vary according to the degree of image degradation, the features of the frequency characteristics output from the feature extracting portion 4 also vary. Thus, a plurality of features of the reference characteristics according to the varying features of the frequency characteristics output from the feature extracting portion 4 are stored in the table storing portion 22. It should be noted that the correspondence output portion is not limited to the table storing portion 22 but may be configured with elements other than the table, for example, a computation circuit.

A correction amount calculating portion 21 acquires the features of the reference frequency characteristics from the table storing portion 22 based on the features of the frequency characteristics of 8×8 dots of an monitor image output from the feature extracting portion 4. Also, the correction amount calculating portion 21 calculates the differences between the features of the reference frequency characteristics acquired from the table storing portion 22 and the features of the frequency characteristics of a photographed image output from the feature extracting portion 4. Further, the correction amount calculating portion 21 performs a frequency inverse transform of the calculated differences so as to calculate correction characteristics of 8×8 dots. Here, the "monitor image" refers to an image captured by the CCD image sensor 12 when the imaging apparatus is in the monitor mode. Also, the "photographed image" refers to an image captured by the CCD image sensor 12 when the release switch 15 is operated.

A recording control portion 23 has control so as to record the image signal output from the image correcting portion 5 in a memory card 24. Further, the recording control portion 23 also is capable of carrying out a compression processing in a predetermined image compression format when the image signal is recorded in the memory card 24. Incidentally, the memory card 24 merely is an example of an information medium and may be other media as long as it is capable of recording the image signal.

An image processing portion 25 is configured by the feature extracting portion 4, the image correcting portion 5, the correction amount calculating portion 21 and the table storing portion 22.

Now, the operation of the imaging apparatus will be described.

First, when the imaging apparatus is in the monitor mode, the microcomputer 14 controls the CCD driving portion 13 so that the CCD image sensor 12 operates in the pixel mixing driving mode. The image signal (analog signal) output from the CCD image sensor 12 is converted to a digital image signal by the A/D converter portion 16. The digitized image signal output from the A/D converter portion 16 is input to the signal processing portion 17. The signal processing portion 17 subjects the image signal output from the A/D converter portion 16 to various signal processings such as noise removal. The image signal output from the signal processing portion 17 is written in the frame memory 18 and read out periodically from the frame memory 18. The image signal read out from the frame memory 18 is input to the display control portion 19 and processed to be converted to an image signal that can be displayed on the monitor 20. In this way, a moving image configured by monitor images (a so-called "through image") is displayed on the monitor 20.

When the release switch 15 is operated while the imaging apparatus is in the monitor mode, the microcomputer 14 controls the CCD driving portion 13 so that the CCD image sensor 12 operates in the all-pixel readout mode. The image signal (analog signal) output from the CCD image sensor 12 is converted to a digital image signal by the A/D converter portion 16. The digitized image signal output from the A/D converter portion 16 is input to the signal processing portion 17. The signal processing portion 17 subjects the image signal output from the A/D converter portion 16 to various signal processings such as noise removal. The image signal output from the signal processing portion 17 is written in the frame memory 18 and also is output to the image correcting portion 5. The image signal read out from the frame memory 18 is input to the display control portion 19 and processed to be converted to an image signal that can be displayed on the monitor 20. In this way, a photographed image (still image) is displayed on the monitor 20.

On the other hand, the image correcting portion 5 corrects the frequency characteristic of the image signal output from the signal processing portion 17. The corrected image signal is output to the recording control portion 23. The recording control portion 23 converts the image signal output from the image correcting portion 5 into a format that is recordable in the memory card 24 and writes it in the memory card 24.

2. Operation of Image Processing Portion 25

First, when the imaging apparatus is in the monitor mode, the CCD image sensor 12 operates in the pixel mixing driving mode. Accordingly, image signals from which pixels are thinned out horizontally and vertically are written sequentially in the frame memory 18.

Next, when the release switch 15 is operated while the imaging apparatus is in the monitor mode, the microcomputer 14 controls the CCD driving portion 13 so that the CCD image sensor 12 executes an exposure operation. After a predetermined exposure period, the microcomputer 14 controls the CCD driving portion 13 so that the CCD image sensor 12 stops the exposure operation.

Then, the microcomputer 14 controls the CCD driving portion 13 so that the CCD image sensor 12 operates in the all-pixel readout mode. The CCD driving portion 13 causes the CCD image sensor 12 to operate in the all-pixel readout mode for one frame period.

The image signal read out from the CCD image sensor 12 is converted to digital form by the A/D converter portion 16 and input to the signal processing portion 17. The signal processing portion 17 subjects the image signal output from the A/D converter portion 16 to a predetermined signal processing and outputs it to the frame memory 18. Here, when the release switch 15 is operated, the frame memory 18 outputs an image signal of the last image in the monitor image (the image signal of the monitor image immediately before the image signal of the photographed image is written in the frame memory 18) to the feature extracting portion 4.

The feature extracting portion 4 divides an image based on the image signal of the last image output from the frame memory 18 into small regions (for example, of about 8×8 dots) similarly to Embodiment 1 (S101 in FIG. 4). The size of the small regions depends on the amount of camera shake that needs correction. When the image is degraded considerably due to considerable camera shake, the size of the small regions has to be large.

Next, the feature extracting portion 4 performs a two-dimensional frequency analysis (S102 in FIG. 4). The method of the two-dimensional frequency analysis can be Fourier transform, discrete cosine transform (DCT), wavelet transform or the like. By the above-noted frequency analysis, the image signals of the images of the small regions of 8×8 dots are transformed into frequency characteristics corresponding to the respective small regions of 8×8 dots.

Subsequently, the feature extracting portion 4 averages the frequency characteristics obtained for the respective small regions over the entire image (S103 in FIG. 4). The features of the frequency characteristics averaged by the feature extracting portion 4 are input to the correction amount calculating portion 21.

Figure 18:
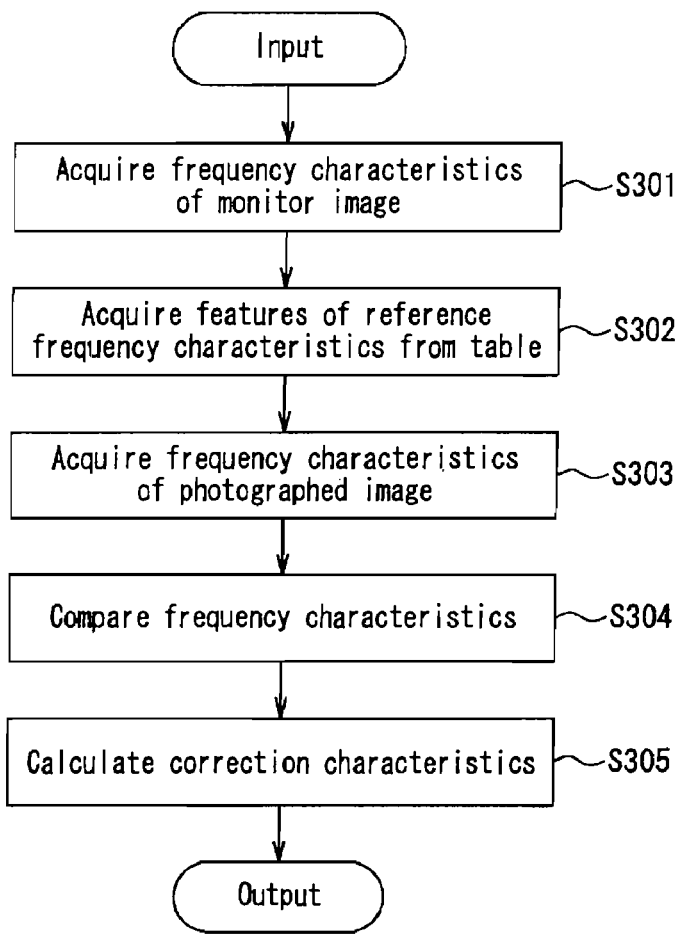
FIG. 18 is a flowchart showing an operation of a correction amount calculating portion in the image processing apparatus according to Embodiment 3.
Figure 19:
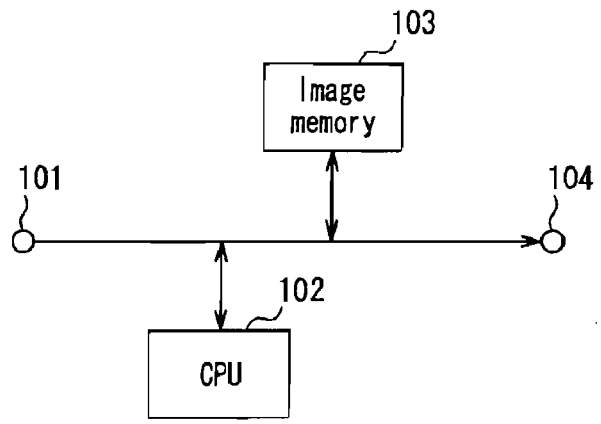
FIG. 19 is a block diagram showing a configuration of a conventional image processing apparatus.
Figure 20:
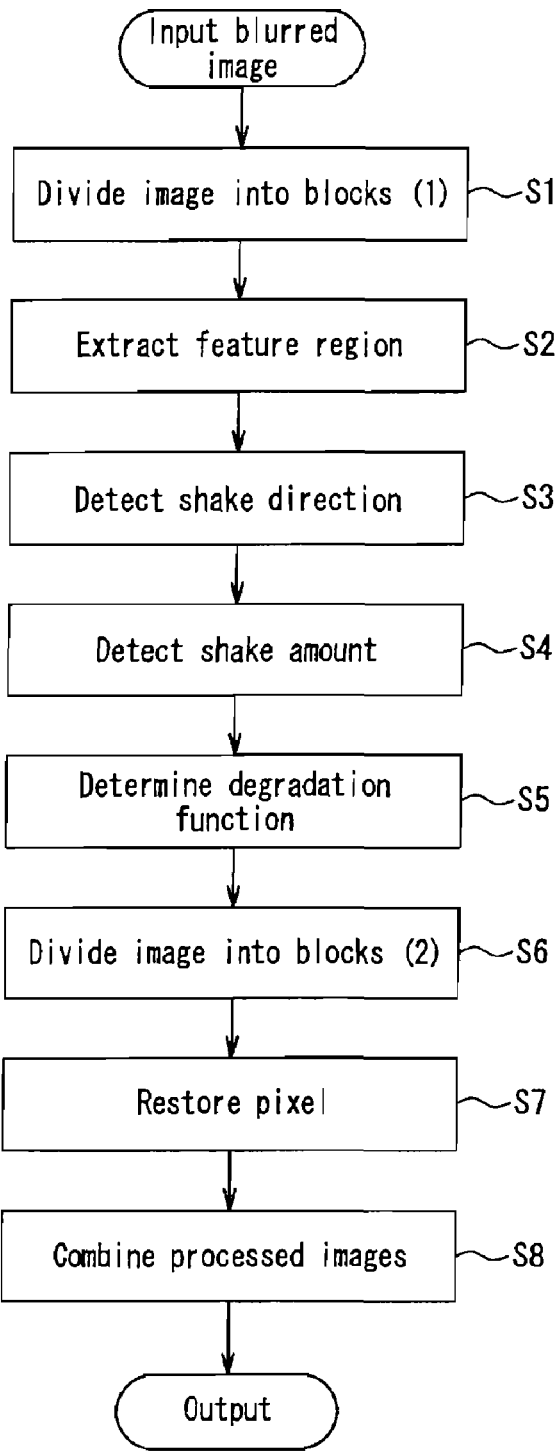
FIG. 20 is a flowchart for describing a camera shake correction method in the conventional image processing apparatus.

FIG. 18 shows the operation of the correction amount calculating portion 21 in Embodiment 3. First, the features of the frequency characteristics output from the feature extracting portion 4 are input to the correction amount calculating portion 21 (S301). The correction amount calculating portion 21 acquires from the table storing portion 22 the features of the reference frequency characteristics corresponding to the features of the frequency characteristics output from the feature extracting portion 4 (S302).

Here, in the table storing portion 22, a table containing the correspondence between features of various frequency characteristics output from the feature extracting portion 4 and features of frequency characteristics for correcting a photographed image is stored. In other words, the image signal of the last image input to the feature extracting portion 4 has a lower resolution than the photographed image because it is an image obtained when the CCD image sensor 12 is in the pixel mixing driving mode. Thus, if the photographed image is corrected by inputting the features of the frequency characteristics output from the feature extracting portion 4 directly to the image correcting portion 5, the difference in resolution between the last image and the photographed image results in lower image quality. Accordingly, in the table storing portion 22 in the present embodiment, the features of the ideal frequency characteristics in the case where the resolution of the last image is raised to that of the photographed image are listed in a table as the features of the reference frequency characteristics and stored.

Further, in the table storing portion 22, features of the frequency characteristics of the monitor image and features of reference frequency characteristics corresponding respectively to these features of the frequency characteristics are stored. Thus, when the features of the frequency characteristics of the last image (monitor image) output from the feature extracting portion 4 vary, the correction amount calculating portion 21 changes the features of the reference frequency characteristics acquired from the table storing portion 22. It should be noted that the features of the reference frequency characteristics stored in the table storing portion 22 may be characteristics calculated theoretically or characteristics obtained by actual measurement.

Moreover, when the imaging apparatus is in the monitor mode, owing to a fast shutter speed (in general, 1/30 seconds or faster) of an electronic shutter in the CCD image sensor 12, an image is not degraded very much due to camera shake. Therefore, the configuration in which the features of the reference frequency characteristics are extracted from the features of the frequency characteristics of the last image in the monitor mode allows a proper image correction.

Next, the feature extracting portion 4 divides an image based on the image signal of the photographed image output from the frame memory 18 into small regions (for example, of about 8×8 dots) similarly to the above (S101 in FIG. 4) and performs a two-dimensional frequency analysis (S102 in FIG. 4). Subsequently, the feature extracting portion 4 averages the frequency characteristics obtained for the respective small regions over the entire image (S103 in FIG. 4) and outputs the features of the frequency characteristics to the correction amount calculating portion 21.

Then, the features of the frequency characteristics of the photographed image output from the feature extracting portion 4 are input to the correction amount calculating portion 21 (S303).

Thereafter, the correction amount calculating portion 21 calculates the differences between the features of the frequency characteristics of the photographed image output from the feature extracting portion 4 and the features of the reference frequency characteristics acquired from the table storing portion 22 (S304).

Next, the correction amount calculating portion 21 performs a frequency inverse transform of the calculated differences so as to calculate correction characteristics as filter characteristics of 8×8 dots (S305). The correction characteristics calculated by the correction amount calculating portion 21 are input to the image correcting portion 5.

The image correcting portion 5 corrects the frequency characteristics of the image signal of the photographed image output from the signal processing portion 17 based on the correction characteristics calculated by the correction amount calculating portion 21. Incidentally, the specific description of the correction processing has been given in Embodiment 1, etc. and thus will be omitted.

The above-described operation is carried out every time the release switch 15 is operated. In other words, the correction amount calculating portion 21 acquires the features of the reference frequency characteristics according to the frequency characteristics of the last monitor image from the table storing portion 22 and calculates the correction characteristics from the acquired features of the reference frequency characteristics and the features of the frequency characteristics of the photographed image every time the release switch 15 is operated. Thus, the amount of correction of the photographed image in the image correcting portion 5 varies depending on the features of the frequency characteristics of the last image at the time when the release switch 15 is operated.

3. Effects of Embodiment, etc

As described above, according to Embodiment 3, since the feature extracting portion 4 has a configuration of analyzing the frequency characteristics for the individual small regions in the image and extracting the average of the frequency characteristics for the respective small regions over the entire screen, the amount of the frequency characteristics degraded due to camera shake can be detected accurately. Thus, the correction amount calculating portion 21 calculates the correction amount according to the degradation amount of the frequency characteristics detected by the feature extracting portion 4, whereby the image correcting portion 5 can carry out a proper image correction, making it possible to restore an image in which the degradation due to camera shake is suppressed.

Moreover, the table containing the features of the frequency characteristics corresponding to the last image (with a low resolution) and the features of the frequency characteristics for correcting the photographed image (with a high resolution) corresponding to these features of the frequency characteristics is stored in the table storing portion 22. In this way, the correction amount calculating portion 21 extracts the features of the reference frequency characteristics according to the features of the frequency characteristics output from the feature extracting portion 4 and calculates the correction characteristics based on the extracted features of the frequency characteristics, thereby performing an optimal camera shake correction of the photographed image.

Although the feature extracting portion 4 in Embodiment 3 is configured to calculate the averages, it also may be configured to calculate the maximum values as described in Embodiment 2 (see FIG. 8). With such a configuration, the table containing the features of the frequency characteristics based on the maximum values calculated by the feature extracting portion 4 and the features of the reference frequency characteristics is stored in the table storing portion 22, whereby the operation similar to the above is possible. Thus, the image correcting portion 5 can carry out a proper image correction, making it possible to restore an image in which the degradation due to camera shake is suppressed.

Although the CCD image sensor 12 in Embodiment 3 is configured to be operated while switching between the pixel mixing driving mode and the all-pixel readout mode, the configuration of operating in only one of these driving modes may be adopted. In that case, the signal processing portion 17 may be configured to carry out pixel mixing or to thin out the pixels, for example. In other words, it is possible to adopt any configurations as long as a low resolution image and a high resolution image can be generated selectively.

Since the image processing apparatus according to the present invention achieves excellent effects of being impervious to frequency characteristics of a subject and being capable of correcting image degradation properly so as to restore a blurred image back to an original state, it is useful for equipment having a still image capturing function such as a digital camera, a video camera equipped with a still image capturing function and a mobile phone equipped with a still image capturing function. Also, the image processing program according to the present invention is useful as an image processing program that is executed in a personal computer or the like.

[Note 1]

An image processing apparatus according to the present invention includes a feature extracting portion that extracts a feature of a frequency characteristic of an input image, a correction amount calculating portion that calculates a correction amount of the frequency characteristic from the feature extracted by the feature extracting portion, and an image correcting portion that corrects the input image according to the correction amount calculated by the correction amount calculating portion.

With this configuration, it is possible to achieve an excellent effect of correcting image degradation properly so as to restore an image that is degraded due to camera shake, without being influenced considerably by frequency characteristics of a subject.

[Note 2]

In the image processing apparatus according to the present invention, the feature extracting portion can be configured to divide the input image into a plurality of small regions and extract an average of features of frequency characteristics of the plurality of small regions over an entire screen of the input image.

This configuration makes it possible to grasp the features of the frequency characteristics over the entire image, so that a camera shake correction that is impervious to the frequency characteristic in a part of the subject can be achieved.

[Note 3]

In the image processing apparatus according to the present invention, the feature extracting portion can be configured to divide the input image into a plurality of small regions and extract a maximum value of features of frequency characteristics of the plurality of small regions over an entire screen of the input image.

With this configuration, the degradation amount of the frequency characteristic due to camera shake can be extracted accurately.

[Note 4]

In the image processing apparatus according to the present invention, the correction amount calculating portion can be configured to compare the feature of the frequency characteristic extracted by the feature extracting portion and a feature of a reference frequency characteristic and calculate the correction amount that brings the extracted feature of the frequency characteristic closer to the feature of the reference frequency characteristic.

With this configuration, the degradation of the frequency characteristic due to camera shake can be corrected properly.

[Note 5]

In the image processing apparatus according to the present invention, the feature extracting portion can be configured to divide the input image into a plurality of small regions and extract an average and a maximum value of features of frequency characteristics of the plurality of small regions over an entire screen of the input image. The correction amount calculating portion can be configured to compare a new feature of a frequency characteristic obtained by a computation of the average and the maximum value of the features of the frequency characteristics extracted by the feature extracting portion and a feature of a reference frequency characteristic and calculate the correction amount that brings the new feature of the frequency characteristic closer to the feature of the reference frequency characteristic.

This configuration makes it possible to grasp the features of the frequency characteristics over the entire image, so that a camera shake correction that is impervious to the frequency characteristic in a part of the subject can be achieved. Also, the degradation amount of the frequency characteristic due to camera shake can be extracted accurately.

[Note 6]

In the image processing apparatus according to the present invention, the correction amount calculating portion can be configured to be capable of changing the feature of the reference frequency characteristic.

With this configuration, it is possible not only to perform the camera shake correction but also adjust an image quality according to an image capturing condition, etc.

[Note 7]

In the image processing apparatus according to the present invention, the feature extracting portion can be configured to divide the input image into a plurality of small regions, compare features of frequency characteristics of the plurality of small regions and a feature of a second reference frequency characteristic and change a size of the plurality of small regions.

This configuration makes it possible to correct the camera shake properly even when there is a large amount of camera shake.

[Note 8]

In the image processing apparatus according to the present invention, the correction amount calculating portion can be configured to restrict the correction amount to an amount less than a predetermined amount.

With this configuration, the image degradation caused by over-correction of the frequency characteristics can be suppressed.

[Note 9]

In the image processing apparatus according to the present invention, the image correcting portion can be configured to suppress a signal level of a signal with a small amplitude in the input image corrected according to the correction amount calculated by the correction amount calculating portion.

With this configuration, the influence of noise accompanying the camera shake correction processing can be suppressed.

[Note 10]

An image processing program according to the present invention causes a computer to function as a feature extracting portion that extracts a feature of a frequency characteristic of an input image, a correction amount calculating portion that calculates a correction amount of the frequency characteristic from the feature extracted by the feature extracting portion, and an image correcting portion that corrects the input image according to the correction amount calculated by the correction amount calculating portion.

With this configuration, it is possible to achieve an excellent effect of correcting image degradation properly so as to restore an image that is degraded due to camera shake, without being influenced considerably by frequency characteristics of a subject.

[Note 11]

In the image processing program according to the present invention, the feature extracting portion can perform processing so as to divide the input image into a plurality of small regions and extract an average of features of frequency characteristics of the plurality of small regions over an entire screen of the input image.

This configuration makes it possible to grasp the features of the frequency characteristics over the entire image, so that a camera shake correction that is impervious to the frequency characteristic in a part of the subject can be achieved.

[Note 12]

In the image processing program according to the present invention, the feature extracting portion can perform processing so as to divide the input image into a plurality of small regions and extract a maximum value of features of frequency characteristics of the plurality of small regions over an entire screen of the input image.

With this configuration, the degradation amount of the frequency characteristic due to camera shake can be extracted accurately.

[Note 13]

In the image processing program according to the present invention, the correction amount calculating portion can perform processing so as to compare the feature of the frequency characteristic extracted by the feature extracting portion and a feature of a reference frequency characteristic and calculate the correction amount that brings the extracted feature of the frequency characteristic closer to the feature of the reference frequency characteristic.

With this configuration, the degradation of the frequency characteristic due to camera shake can be corrected properly.

[Note 14]

In the image processing program according to the present invention, the feature extracting portion can perform processing so as to divide the input image into a plurality of small regions and extract an average and a maximum value of features of frequency characteristics of the plurality of small regions over an entire screen of the input image. The correction amount calculating portion can perform processing so as to compare a new feature of a frequency characteristic obtained by a computation of the average and the maximum value of the features of the frequency characteristics extracted by the feature extracting portion and a feature of a reference frequency characteristic and calculate the correction amount that brings the new feature of the frequency characteristic closer to the feature of the reference frequency characteristic.

This configuration makes it possible to grasp the features of the frequency characteristics over the entire image, so that a camera shake correction that is impervious to the frequency characteristic in a part of the subject can be achieved. Also, the degradation amount of the frequency characteristic due to camera shake can be extracted accurately.

[Note 15]

In the image processing program according to the present invention, the correction amount calculating portion can perform processing so as to change the feature of the reference frequency characteristic.

With this configuration, it is possible not only to perform the camera shake correction but also adjust an image quality according to an image capturing condition, etc.

[Note 16]

In the image processing program according to the present invention, the feature extracting portion can perform processing so as to divide the input image into a plurality of small regions, compare features of frequency characteristics of the plurality of small regions and a feature of a second reference frequency characteristic and change a size of the plurality of small regions.

This configuration makes it possible to correct the camera shake properly even when there is a large amount of camera shake.

[Note 17]

In the image processing program according to the present invention, the correction amount calculating portion can perform processing so as to restrict the correction amount to an amount less than a predetermined amount.

With this configuration, the image degradation caused by over-correction of the frequency characteristics can be suppressed.

[Note 18]

In the image processing program according to the present invention, the image correcting portion can perform processing so as to suppress a signal level of a signal with a small amplitude in the input image corrected according to the correction amount calculated by the correction amount calculating portion.

With this configuration, the influence of noise accompanying the camera shake correction processing can be suppressed.

[Note 19]

An imaging apparatus according to the present invention includes an imaging system that is capable of generating a low resolution image and a high resolution image selectively, an image storing portion that stores an image signal of an image generated by the imaging system, a feature extracting portion that extracts a feature of a frequency characteristic of the image signal stored in the image storing portion, a correspondence output portion that outputs a reference frequency characteristic corresponding to the feature of the frequency characteristic of the image signal of the low resolution image extracted by the feature extracting portion, a correction amount calculating portion that calculates a correction amount based on the feature of the frequency characteristic extracted by the feature extracting portion and a feature of the reference frequency characteristic output from the correspondence output portion, and an image correcting portion that corrects the image signal of the high resolution image according to the correction amount calculated by the correction amount calculating portion. The correction amount calculating portion reads out from the correspondence output portion the reference frequency characteristic corresponding to the feature of the frequency characteristic of the image signal of the low resolution image extracted by the feature extracting portion, compares the feature of the frequency characteristic of the image signal of the high resolution image extracted by the feature extracting portion and the feature of the reference frequency characteristic read out from the correspondence output portion and calculates the correction amount that brings the feature of the frequency characteristic of the image signal of the high resolution image extracted by the feature extracting portion closer to the feature of the reference frequency characteristic read out from the correspondence output portion.

With this configuration, it is possible to achieve an excellent effect of performing an optimal camera shake correction of a photographed image, without being influenced considerably by frequency characteristics of a subject.

[Note 20]

In the imaging apparatus according to the present invention, the feature extracting portion can be configured to divide the image based on the image signal stored in the image storing portion into a plurality of small regions and extract an average of features of frequency characteristics of the plurality of small regions over an entire screen of the image based on the image signal stored in the image storing portion.

This configuration makes it possible to grasp the features of the frequency characteristics over the entire image, so that a camera shake correction that is impervious to the frequency characteristic in a part of the subject can be achieved.

[Note 21]

In the imaging apparatus according to the present invention, the feature extracting portion can be configured to divide the image based on the image signal stored in the image storing portion into a plurality of small regions and extract a maximum value of features of frequency characteristics of the plurality of small regions over an entire screen of the image based on the image signal stored in the image storing portion.

With this configuration, the degradation amount of the frequency characteristic due to camera shake can be extracted accurately.

[Note 22]

In the imaging apparatus according to the present invention, the feature extracting portion can be configured to divide the image based on the image signal stored in the image storing portion into a plurality of small regions and extract an average and a maximum value of features of frequency characteristics of the plurality of small regions over an entire screen of the image based on the image signal stored in the image storing portion, and the correction amount calculating portion can be configured to compare a new feature of a frequency characteristic obtained by a computation of the average and the maximum value of the features of the frequency characteristics extracted by the feature extracting portion and a feature of a reference frequency characteristic and calculate the correction amount that brings the new feature of the frequency characteristic closer to the feature of the reference frequency characteristic.

This configuration makes it possible to grasp the features of the frequency characteristics over the entire image, so that a camera shake correction that is impervious to the frequency characteristic in a part of the subject can be achieved. Also, the degradation amount of the frequency characteristic due to camera shake can be extracted accurately.

[Note 23]

In the imaging apparatus according to the present invention, the correction amount calculating portion can be configured to be capable of changing the feature of the reference frequency characteristic.

With this configuration, it is possible not only to perform the camera shake correction but also adjust an image quality according to an image capturing condition, etc.

[Note 24]

In the imaging apparatus according to the present invention, the feature extracting portion can be configured to divide the image based on the image signal stored in the image storing portion into a plurality of small regions, compare features of frequency characteristics of the plurality of small regions and a feature of a second reference frequency characteristic and change a size of the plurality of small regions.

This configuration makes it possible to correct the camera shake properly even when there is a large amount of camera shake.

[Note 25]

In the imaging apparatus according to the present invention, the correction amount calculating portion can be configured to restrict the correction amount to an amount less than a predetermined amount.

With this configuration, the image degradation caused by over-correction of the frequency characteristics can be suppressed.

[Note 26]

In the imaging apparatus according to the present invention, the image correcting portion can be configured to suppress a signal level of a signal with a small amplitude in the input image corrected according to the correction amount calculated by the correction amount calculating portion.

With this configuration, the influence of noise accompanying the camera shake correction processing can be suppressed.

[Note 27]

In the imaging apparatus according to the present invention, the low resolution image is an image captured immediately before the high resolution image.

With this configuration, it is possible to achieve an excellent effect of performing an optimal camera shake correction of a photographed image, without being influenced considerably by frequency characteristics of a subject.

[Note 28]

In the imaging apparatus according to the present invention, the correspondence output portion can be configured to store a table containing the reference frequency characteristic corresponding to the feature of the frequency characteristic of the image signal of the low resolution image extracted by the feature extracting portion.

With this configuration, it is possible to achieve an excellent effect of performing an optimal camera shake correction of a photographed image, without being influenced considerably by frequency characteristics of a subject.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image processing apparatus, comprising:
    a feature extracting portion that extracts a feature of a frequency characteristic of an input image;
    a correction amount calculating portion that calculates a correction amount of the frequency characteristic from the feature extracted by the feature extracting portion; and
    an image correcting portion that corrects the input image according to the correction amount calculated by the correction amount calculating portion,
    wherein the feature extracting portion divides the input image into a plurality of small regions and extracts an average of features of frequency characteristics of the plurality of small regions over an entire screen of the input image, and
    the correction amount calculating portion compares the average of the feature of the frequency characteristic extracted by the feature extracting portion and a feature of a previously stored reference frequency characteristic and calculates the correction amount that brings the average of the features of the frequency characteristics closer to the feature of the previously stored reference frequency characteristic.

2. The image processing apparatus according to claim 1, wherein the correction amount calculating portion is capable of changing the feature of the previously stored reference frequency characteristic.

3. The image processing apparatus according to claim 1, wherein the feature extracting portion (a) divides the input image into a plurality of small regions, (b) compares (i) features of frequency characteristics of the plurality of small regions and (ii) a feature of a second reference frequency characteristic, and (c) changes a size of the plurality of small regions.

4. The image processing apparatus according to claim 1, wherein the correction amount calculating portion restricts the correction amount to an amount less than a predetermined amount.

5. The image processing apparatus according to claim 1, wherein the image correcting portion suppresses a signal level of a signal with a small amplitude in the input image corrected according to the correction amount calculated by the correction amount calculating portion.

6. The image processing apparatus according to claim 1, wherein the feature of the previously stored reference frequency characteristic refers to a feature of a frequency characteristic of an image captured in a state where no camera shake is present.

7. An image processing apparatus, comprising:
a feature extracting portion that extracts a feature of a frequency characteristic of an input image;
a correction amount calculating portion that calculates a correction amount of the frequency characteristic from the feature extracted by the feature extracting portion; and
an image correcting portion that corrects the input image according to the correction amount calculated by the correction amount calculating portion,
wherein the feature extracting portion divides the input image into a plurality of small regions and extracts a maximum value of features of frequency characteristics of the plurality of small regions over an entire screen of the input image, and
the correction amount calculating portion compares the maximum value of the features of the frequency characteristics extracted by the feature extracting portion and a feature of a previously stored reference frequency characteristic and calculates the correction amount that brings the maximum value of the features of the frequency characteristic closer to the feature of the previously stored reference frequency characteristic.

8. The image processing apparatus according to claim 7, wherein the correction amount calculating portion is capable of changing the feature of the previously stored reference frequency characteristic.

9. The image processing apparatus according to claim 7, wherein the feature extracting portion (a) divides the input image into a plurality of small regions, (b) compares (i) features of frequency characteristics of the plurality of small regions and (ii) a feature of a second reference frequency characteristic, and (c) changes a size of the plurality of small regions.

10. The image processing apparatus according to claim 7, wherein the correction amount calculating portion restricts the correction amount to an amount less than a predetermined amount.

11. The image processing apparatus according to claim 7, wherein the image correcting portion suppresses a signal level of a signal with a small amplitude in the input image corrected according to the correction amount calculated by the correction amount calculating portion.

12. The image processing apparatus according to claim 7, wherein the feature of the previously stored reference frequency characteristic refers to a feature of a frequency characteristic of an image captured in a state where no camera shake is present.

13. An image processing apparatus, comprising:
a feature extracting portion that extracts a feature of a frequency characteristic of an input image;
a correction amount calculating portion that calculates a correction amount of the frequency characteristic from the feature extracted by the feature extracting portion; and
an image correcting portion that corrects the input image according to the correction amount calculated by the correction amount calculating portion,
wherein the feature extracting portion divides the input image into a plurality of small regions and extracts an average and a maximum value of features of frequency characteristics of the plurality of small regions over an entire screen of the input image, and
the correction amount calculating portion compares a new feature of a frequency characteristic obtained by a computation of the average and the maximum value of the features of the frequency characteristics extracted by the feature extracting portion and a feature of a previously stored reference frequency characteristic and calculates the correction amount that brings the new feature of the frequency characteristic closer to the feature of the previously stored reference frequency characteristic.

14. The image processing apparatus according to claim 13, wherein the correction amount calculating portion is capable of changing the feature of the previously stored reference frequency characteristic.

15. The image processing apparatus according to claim 13, wherein the feature extracting portion (a) divides the input image into a plurality of small regions, (b) compares (i) features of frequency characteristics of the plurality of small regions and (ii) a feature of a second reference frequency characteristic, and (c) changes a size of the plurality of small regions.

16. The image processing apparatus according to claim 13, wherein the correction amount calculating portion restricts the correction amount to an amount less than a predetermined amount.

17. The image processing apparatus according to claim 13, wherein the image correcting portion suppresses a signal level of a signal with a small amplitude in the input image corrected according to the correction amount calculated by the correction amount calculating portion.

18. The image processing apparatus according to claim 13, wherein the feature of the previously stored reference frequency characteristic refers to a feature of a frequency characteristic of an image captured in a state where no camera shake is present.

19. A non-transitory computer-readable memory having stored thereon an image processing program causing a computer to function as
a feature extracting portion that extracts a feature of a frequency characteristic of an input image;
a correction amount calculating portion that calculates a correction amount of the frequency characteristic from the feature extracted by the feature extracting portion; and
an image correcting portion that corrects the input image according to the correction amount calculated by the correction amount calculating portion,
wherein the feature extracting portion divides the input image into a plurality of small regions and extracts an average of features of frequency characteristics of the plurality of small regions over an entire screen of the input image, and
the correction amount calculating portion compares the average of the features of the frequency characteristics extracted by the feature extracting portion and a feature of a previously stored reference frequency characteristic and calculates the correction amount that brings the average of the feature of the frequency characteristic closer to the feature of the previously stored reference frequency characteristic.

20. The non-transitory computer-readable memory having stored thereon the image processing program according to claim 19, wherein the correction amount calculating portion is capable of changing the feature of the previously stored reference frequency characteristic.

21. The non-transitory computer-readable memory having stored thereon the image processing program according to claim 19, wherein the feature extracting portion (a) divides the input image into a plurality of small regions, (b) compares (i) features of frequency characteristics of the plurality of small regions and (ii) a feature of a second reference frequency characteristic, and (c) changes a size of the plurality of small regions.

22. The non-transitory computer-readable memory having stored thereon the image processing program according to claim 19, wherein the correction amount calculating portion restricts the correction amount to an amount less than a predetermined amount.

23. The non-transitory computer-readable memory having stored thereon the image processing program according to claim 19, wherein the image correcting portion suppresses a signal level of a signal with a small amplitude in the input image corrected according to the correction amount calculated by the correction amount calculating portion.

24. The image processing apparatus according to claim 19, wherein the feature of the previously stored reference frequency characteristic refers to a feature of a frequency characteristic of an image captured in a state where no camera shake is present.

25. A non-transitory computer-readable memory having stored thereon an image processing program causing a computer to function as
   a feature extracting portion that extracts a feature of a frequency characteristic of an input image;
   a correction amount calculating portion that calculates a correction amount of the frequency characteristic from the feature extracted by the feature extracting portion; and
   an image correcting portion that corrects the input image according to the correction amount calculated by the correction amount calculating portion,
   wherein the feature extracting portion divides the input image into a plurality of small regions and extracts a maximum value of features of frequency characteristics of the plurality of small regions over an entire screen of the input image, and
   the correction amount calculating portion compares the maximum value of the features of the frequency characteristics extracted by the feature extracting portion and a feature of a previously stored reference frequency characteristic and calculates the correction amount that brings the maximum value of the features of the frequency characteristic closer to the feature of the previously stored reference frequency characteristic.

26. The image processing program according to claim 25, wherein the correction amount calculating portion is capable of changing the feature of the previously stored reference frequency characteristic.

27. The image processing program according to claim 25, wherein the feature extracting portion (a) divides the input image into a plurality of small regions, (b) compares (i) features of frequency characteristics of the plurality of small regions and (ii) a feature of a second reference frequency characteristic, and (c) changes a size of the plurality of small regions.

28. The image processing program according to claim 25, wherein the correction amount calculating portion restricts the correction amount to an amount less than a predetermined amount.

29. The image processing program according to claim 25, wherein the image correcting portion suppresses a signal level of a signal with a small amplitude in the input image corrected according to the correction amount calculated by the correction amount calculating portion.

30. The image processing apparatus according to claim 25, wherein the feature of the previously stored reference frequency characteristic refers to a feature of a frequency characteristic of an image captured in a state where no camera shake is present.

31. A non-transitory computer-readable memory having stored thereon an image processing program causing a computer to function as
   a feature extracting portion that extracts a feature of a frequency characteristic of an input image;
   a correction amount calculating portion that calculates a correction amount of the frequency characteristic from the feature extracted by the feature extracting portion; and
   an image correcting portion that corrects the input image according to the correction amount calculated by the correction amount calculating portion,
   wherein the feature extracting portion divides the input image into a plurality of small regions and extracts an average and a maximum value of features of frequency characteristics of the plurality of small regions over an entire screen of the input image, and
   the correction amount calculating portion compares a new feature of a frequency characteristic obtained by a computation of the average and the maximum value of the features of the frequency characteristics extracted by the feature extracting portion and a feature of a previously stored reference frequency characteristic and calculates the correction amount that brings the new feature of the frequency characteristic closer to the feature of the previously stored reference frequency characteristic.

32. The image processing program according to claim 31, wherein the correction amount calculating portion is capable of changing the feature of the previously stored reference frequency characteristic.

33. The image processing program according to claim 31, wherein the feature extracting portion (a) divides the input image into a plurality of small regions, (b) compares (i) features of frequency characteristics of the plurality of small regions and (ii) a feature of a second reference frequency characteristic, and (c) changes a size of the plurality of small regions.

34. The image processing program according to claim 31, wherein the correction amount calculating portion restricts the correction amount to an amount less than a predetermined amount.

35. The image processing program according to claim 31, wherein the image correcting portion suppresses a signal level of a signal with a small amplitude in the input image corrected according to the correction amount calculated by the correction amount calculating portion.

36. The image processing apparatus according to claim 31, wherein the feature of the previously stored reference frequency characteristic refers to a feature of a frequency characteristic of an image captured in a state where no camera shake is present.

37. An imaging apparatus, comprising:
   an imaging system that generates a low resolution image and a high resolution image;
   an image storing portion that stores an image signal of an image generated by the imaging system;
   a feature extracting portion that extracts a feature of a frequency characteristic of the image signal stored in the image storing portion;
   a correspondence output portion that outputs a reference frequency characteristic corresponding to the feature of the frequency characteristic of the image signal of the low resolution image extracted by the feature extracting portion;

a correction amount calculating portion that calculates a correction amount based on the feature of the frequency characteristic extracted by the feature extracting portion and a feature of the reference frequency characteristic output from the correspondence output portion; and an image correcting portion that corrects the image signal of the high resolution image according to the correction amount calculated by the correction amount calculating portion;

wherein the correction amount calculating portion reads out from the correspondence output portion the reference frequency characteristic corresponding to the feature of the frequency characteristic of the image signal of the low resolution image extracted by the feature extracting portion, compares the feature of the frequency characteristic of the image signal of the high resolution image extracted by the feature extracting portion and the feature of the reference frequency characteristic read out from the correspondence output portion and calculates the correction amount that brings the feature of the frequency characteristic of the image signal of the high resolution image extracted by the feature extracting portion closer to the feature of the reference frequency characteristic read out from the correspondence output portion.

38. The imaging apparatus according to claim 37, wherein the feature extracting portion divides the image based on the image signal stored in the image storing portion into a plurality of small regions and extracts an average of features of frequency characteristics of the plurality of small regions over an entire screen of the image based on the image signal stored in the image storing portion.

39. The imaging apparatus according to claim 37, wherein the feature extracting portion divides the image based on the image signal stored in the image storing portion into a plurality of small regions and extracts a maximum value of features of frequency characteristics of the plurality of small regions over an entire screen of the image based on the image signal stored in the image storing portion.

40. The imaging apparatus according to claim 37, wherein the feature extracting portion divides the image based on the image signal stored in the image storing portion into a plurality of small regions and extracts an average and a maximum value of features of frequency characteristics of the plurality of small regions over an entire screen of the image based on the image signal stored in the image storing portion, and the correction amount calculating portion compares a new feature of a frequency characteristic obtained by a computation of the average and the maximum value of the features of the frequency characteristics extracted by the feature extracting portion and a feature of a reference frequency characteristic and calculates the correction amount that brings the new feature of the frequency characteristic closer to the feature of the reference frequency characteristic.

41. The imaging apparatus according to claim 37, wherein the correction amount calculating portion is capable of changing the feature of the reference frequency characteristic.

42. The imaging apparatus according to claim 37, wherein the feature extracting portion divides the image based on the image signal stored in the image storing portion into a plurality of small regions, compares features of frequency characteristics of the plurality of small regions and a feature of a second reference frequency characteristic and changes a size of the plurality of small regions.

43. The imaging apparatus according to claim 37, wherein the correction amount calculating portion restricts the correction amount to an amount less than a predetermined amount.

44. The imaging apparatus according to claim 37, wherein the image correcting portion suppresses a signal level of a signal with a small amplitude in the input image corrected according to the correction amount calculated by the correction amount calculating portion.

45. The imaging apparatus according to claim 37, wherein the low resolution image is an image captured immediately before the high resolution image.

46. The imaging apparatus according to claim 45, wherein the correspondence output portion stores a table containing the reference frequency characteristic corresponding to the feature of the frequency characteristic of the image signal of the low resolution image extracted by the feature extracting portion.

47. The imaging apparatus according to claim 37, wherein the correspondence output portion stores a table containing the reference frequency characteristic corresponding to the feature of the frequency characteristic of the image signal of the low resolution image extracted by the feature extracting portion.

* * * * *